United States Patent
Fukuda

(10) Patent No.: US 10,432,573 B2
(45) Date of Patent: Oct. 1, 2019

(54) INFORMATION PROCESSING DEVICE, INFORMATION PROCESSING METHOD AND TERMINAL DEVICE

(71) Applicant: Saturn Licensing LLC, New York, NY (US)

(72) Inventor: Kazuhiro Fukuda, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/434,826

(22) Filed: Feb. 16, 2017

(65) Prior Publication Data

US 2017/0163592 A1 Jun. 8, 2017

Related U.S. Application Data

(63) Continuation of application No. 14/407,719, filed as application No. PCT/JP2013/065681 on Jun. 6, 2013, now abandoned.

(30) Foreign Application Priority Data

Jun. 22, 2012 (JP) ................ 2012-140790

(51) Int. Cl.
  *G06F 15/16* (2006.01)
  *H04L 12/58* (2006.01)
  *H04N 21/25* (2011.01)
  *H04N 21/262* (2011.01)
  *H04N 21/4788* (2011.01)

(52) U.S. Cl.
  CPC ........... *H04L 51/32* (2013.01); *H04N 21/252* (2013.01); *H04N 21/262* (2013.01); *H04N 21/4788* (2013.01)

(58) Field of Classification Search
  CPC .... H04L 51/32; H04N 21/262; H04N 21/252; H04N 21/4788
  USPC .......................................... 709/204
  See application file for complete search history.

(56) References Cited

U.S. PATENT DOCUMENTS

| | | | |
|---|---|---|---|
| 8,438,598 B2 | 5/2013 | Sakai et al. | |
| 8,845,429 B2 * | 9/2014 | Garza | H04N 21/44218 463/31 |
| 2006/0229896 A1 * | 10/2006 | Rosen | G06Q 10/1053 705/321 |
| 2008/0270421 A1 | 10/2008 | Ushiyama | |
| 2011/0126251 A1 | 5/2011 | LaFreniere et al. | |
| 2011/0225015 A1 | 9/2011 | Spivack et al. | |

(Continued)

FOREIGN PATENT DOCUMENTS

| | | |
|---|---|---|
| EP | 2131366 A1 | 12/2009 |
| JP | 2006-319442 A | 11/2006 |

(Continued)

*Primary Examiner* — Richard G Keehn
(74) *Attorney, Agent, or Firm* — Lerner, David, Littenberg, Krumholz & Mentlik, LLP

(57) ABSTRACT

There is provided an information processing device including a score calculation unit that calculates, for one or more events for which a plan is set by one or more of users in a user group composed of the plurality of users capable of sharing information by satisfying a predetermined condition and for which the information is capable of being shared in the user group, a score on a predetermined calculation basis using event information which is information related to the events.

29 Claims, 24 Drawing Sheets

(56) References Cited

U.S. PATENT DOCUMENTS

| | | | |
|---|---|---|---|
| 2011/0276372 A1 | 11/2011 | Spivack et al. | |
| 2011/0288962 A1* | 11/2011 | Rankin, Jr. | G06F 17/30525 |
| | | | 705/27.1 |
| 2011/0289106 A1* | 11/2011 | Rankin, Jr. | G06Q 10/10 |
| | | | 707/769 |
| 2011/0289422 A1* | 11/2011 | Spivack | G06Q 30/02 |
| | | | 715/739 |
| 2011/0320536 A1* | 12/2011 | Lobb | G06Q 50/01 |
| | | | 709/205 |
| 2012/0079091 A1* | 3/2012 | Ermis | H04L 41/024 |
| | | | 709/223 |
| 2012/0110621 A1 | 5/2012 | Gossweiler, III | |
| 2012/0123811 A1* | 5/2012 | Socolof | G06Q 10/02 |
| | | | 705/5 |
| 2012/0136921 A1* | 5/2012 | Samdadiya | G06F 11/3006 |
| | | | 709/203 |
| 2012/0270618 A1* | 10/2012 | Abramoff | G07F 17/3288 |
| | | | 463/9 |
| 2012/0296914 A1* | 11/2012 | Romanov | G11B 27/034 |
| | | | 707/741 |
| 2013/0133005 A1 | 5/2013 | Sakai et al. | |
| 2013/0145282 A1* | 6/2013 | Zhao | G06Q 10/109 |
| | | | 715/751 |
| 2014/0258363 A1* | 9/2014 | Peco | H04L 51/32 |
| | | | 709/202 |
| 2015/0193819 A1* | 7/2015 | Chang | G06Q 10/1095 |
| | | | 705/7.19 |

FOREIGN PATENT DOCUMENTS

| | | |
|---|---|---|
| JP | 2009-141952 A | 6/2009 |
| JP | 2010-049498 A | 3/2010 |
| WO | 2011-146946 A2 | 11/2011 |
| WO | 2012057509 A2 | 5/2012 |

\* cited by examiner

INFORMATION PROCESSING DEVICE, INFORMATION PROCESSING METHOD AND TERMINAL DEVICE The present application is a continuation of U.S. patent application Ser. No. 14/407,719, which is a national phase entry under 35 U.S.C. § 371 of International Application No. PCT/JP2013/065681 filed Jun. 6, 2013, published on Dec. 27, 2013 as WO 2013/191006 A1, which claims priority from Japanese Patent Application No. JP 2012-140790 filed in the Japanese Patent Office on Jun. 22, 2012, which is hereby incorporated by reference.

TECHNICAL FIELD

The present invention relates to an information processing device, an information processing method, and a terminal device.

BACKGROUND ART

A social networking service (also called "SNS" hereinafter) which is a service for constructing social connections between a person and a person and between a company and a person or the like on the Internet has widely spread. In the SNS, when a connection is formed between users, information can be shared between the connected users.

In the SNS, there are various kinds of information that can be shared between the users, and among the information that can be shared between the users, there is the information on content of a television program or the like that the user plans to view. When a certain user posts on the SNS the information related to the content that the user plans to view, the other users can view the posted information and reflect it on their own viewing actions. For instance, Patent Literature 1 discloses a technology allowing content to be selected in reference to viewing information of the other users.

CITATION LIST

Patent Literature

Patent Literature 1: JP 2009-141952A

SUMMARY OF INVENTION

Technical Problem

In a conventional SNS, there has been no mechanism in which a user explicitly and continuously posts an action indicating that this program is interesting based on information through browsing of news and websites or the like. In addition, in the conventional SNS, there has been no mechanism of efficiently managing information about a program to be broadcasted in the future based on a program information update and an action from a friend of the user before viewing the program. Also, in the conventional SNS, the user needs to newly describe impressions on the program and post them on the SNS while actually viewing the program or after viewing the program, which is inconvenient.

Therefore, in consideration of the above-described circumstances, efficient management has been demanded when sharing information on an event such as content among the connected users in a service of realizing the connection among the users on the Internet such as the SNS.

Accordingly, the present disclosure provides a new and improved information processing device, information processing method and terminal device capable of efficiently performing management when sharing information on an event such as content among the connected users.

Solution to Problem

According to the present disclosure, there is provided an information processing device including a score calculation unit that calculates, for one or more events for which a plan is set by one or more of users in a user group composed of the plurality of users capable of sharing information by satisfying a predetermined condition and for which the information is capable of being shared in the user group, a score on a predetermined calculation basis using event information which is information related to the events.

According to the present disclosure, there is provided an information processing method including a step of calculating, for one or more events for which a plan is set by one or more of users in a user group composed of the plurality of users capable of sharing information by satisfying a predetermined condition and for which the information is capable of being shared in the user group, a score on a predetermined calculation basis using event information which is information related to the events.

According to the present disclosure, there is provided a terminal device including a display control unit that executes control, for one or more events for which a plan is set by one or more of users in a user group composed of the plurality of users capable of sharing information by satisfying a predetermined condition and for which the information is capable of being shared in the user group, in a manner that the events sorted in an order of scores calculated on a predetermined calculation basis is displayed using event information which is information related to the events.

Advantageous Effects of Invention

As described above, according to the present disclosure, it is possible to provide a new and improved information processing device, information processing method and terminal device capable of efficiently performing management when sharing information on an event such as content among the connected users.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Descriptions will be given in the following order.
<1. One embodiment of the present disclosure>
[Entire configuration example of information processing system]
[Configuration example of plan sharing server]
[Configuration example of SNS server]
[Configuration example of information provision system]
[Configuration example of terminal device]
[Operation example of information processing system]
[GUI example displayed at terminal device]
<2. Summary>
<1. One Embodiment of the Present Disclosure>[Entire Configuration Example of Information Processing System]

Figure 1:
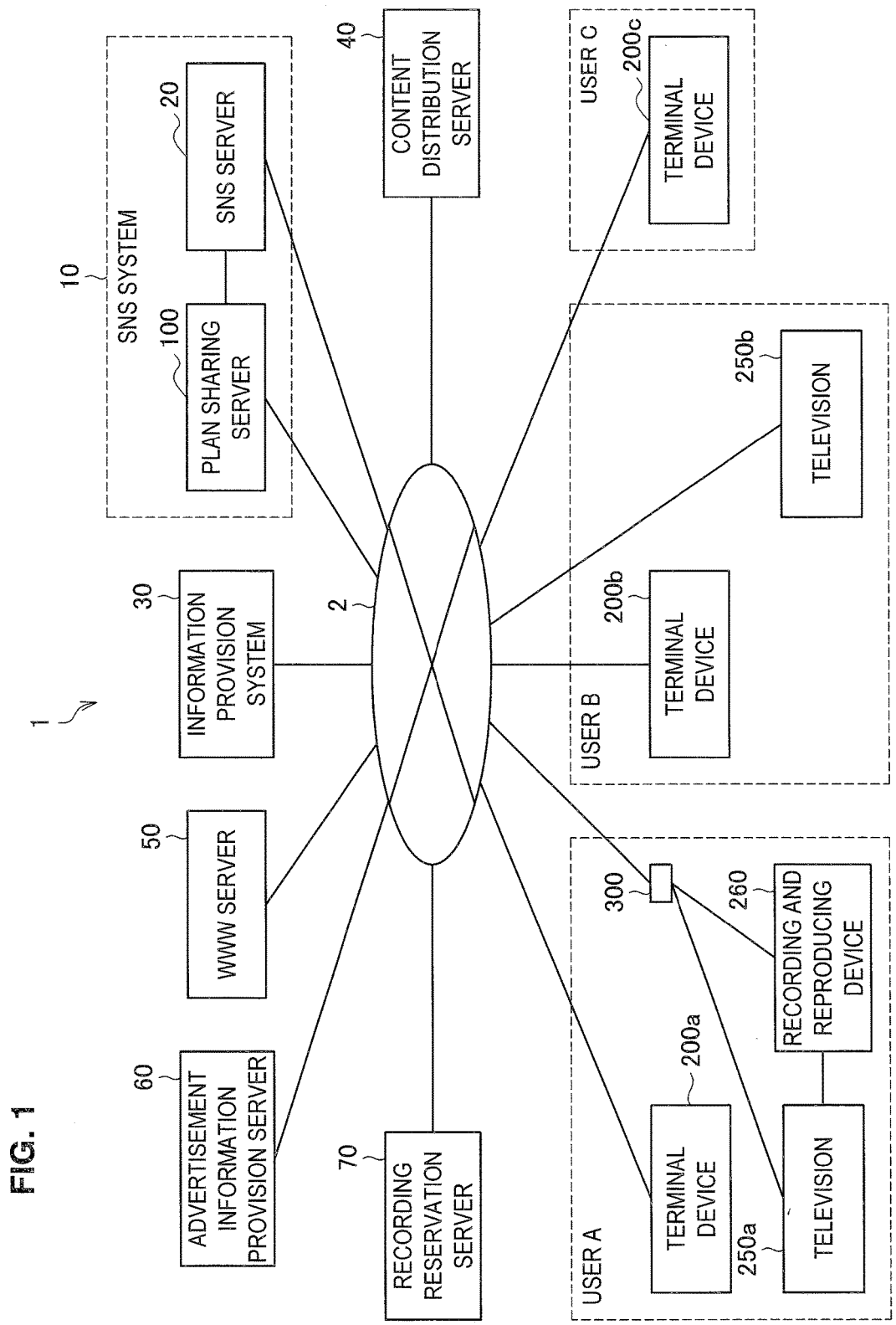
FIG. 1 is an explanatory diagram illustrating an entire configuration example of an information processing system 1 according to one embodiment of the present disclosure.

First, an entire configuration example of an information processing system according to one embodiment of the present disclosure will be described with reference to the drawings. FIG. 1 is an explanatory diagram illustrating an entire configuration example of an information processing system 1 according to one embodiment of the present disclosure. Hereinafter, an entire configuration of the information processing system 1 according to one embodiment of the present disclosure will be described using FIG. 1.

As illustrated in FIG. 1, the information processing system 1 according to one embodiment of the present disclosure includes an SNS system 10, an information provision system 30, a content distribution server 40, a world wide web (WWW) server 50, an advertisement information provision server 60, and a recording reservation server 70. The information processing system 1 according to one embodiment of the present disclosure further includes terminal devices 200a, 200b, and 200c, televisions 250a and 250b, and a recording and reproducing device 260. The SNS system 10, the information provision system 30, the content distribution server 40, the world wide web (WWW) server 50, the advertisement information provision server 60, the recording reservation server 70, the terminal devices 200a, 200b, and 200c, the televisions 250a and 250b, and the recording and reproducing device 260 are connected with each other respectively through a network 2 constituted of the Internet, a local area network (LAN), a wide area network (WAN) or the like.

The SNS system 10 is a system that provides an SNS for constructing social connections between a person and a person or between a company and a person or the like on the Internet. As illustrated in FIG. 1, in the present embodiment, the SNS system 10 includes an SNS server 20 and a plan sharing server 100. The SNS server 20 is a device that provides the SNS for realizing construction of the social connections among the users. By constructing the social connections among the users, the SNS server 20 makes it possible to share information among the connected users. The plan sharing server 100 is an example of the information processing device of the present disclosure, and shares events registered by the individual users. The plan sharing server 100 shares the events registered by the individual users, and presents information on the shared events in the SNS provided by the SNS server 20. Also, the plan sharing server 100 calculates importance degrees of the individual events on the basis of a predetermined calculation condition. The importance degrees of the individual events calculated by the plan sharing server 100 are used in presentation of the information on the events in the SNS provided by the SNS server 20.

In the present embodiment, "event" is an object of "plan sharing action" to be described later. In the present embodiment, "plan sharing action" is an action (an operation of postings and the like) in the SNS taken for a plan that the user wants to share with friends in the future such as what to view or what to record. The objects of the plan sharing action may be as follows for instance when classified into categories stipulated by actions of the user.

What to view: content (television program, Blu-ray disc (BD), DVD, IP broadcasting, video on demand (VOD), and the like)

What to listen: radio, music, and the like

What to do: sports, music. and the like

What to read: books, newspaper, electronic books, and the like

What to cook: recipes, meat, vegetables, fish, and the like

Where to go: tourist spots, museums, theaters, shops, and the like

What to send: souvenirs, presents, and the like

What to buy: sports game tickets, concert tickets, BD, DVD, VOD, and the like

What to meet: friends, actors, actresses, and the like

What to sell: electrical appliances, sports goods, and the like

What to learn: licenses, knowledge, and the like

Here, an example of posting on the SNS in the case that the content of the event is where to go to an X museum is indicated below. Of course, it is needless to say that the content of the posting is not limited to the ones indicated below.

*Declaration of intention of "wanting to go to X museum"
*Information on exhibition in X museum
*Project of goods related to X museum
*Declaration of "going to X museum tomorrow"
*Visit to X museum
*Upload of photos of X museum
*Impressions on X museum
*Upload of goods purchased in X museum
*Declaration of intention of "wanting to visit X museum again"

In the present embodiment, a configuration in which the SNS server 20 and the plan sharing server 100 are included in the SNS system 10 is illustrated; however, the present disclosure is not limited to the example. For instance, the plan sharing server 100 may be independent of the SNS system 10.

The information provision system 30 is a system that provides the information about the event. For instance, in the case that the event is a television program scheduled to be broadcasted in the future, the information provision system 30 holds and provides the information (date and time of broadcasting, a broadcasting channel, a category, a performer, and the like) about the television program. Also, for instance, in the case that the event is the content distributed from a content distribution server 40, the information provision system 30 holds and provides the information (date and time of distribution start, date and time of distribution end, a category, a performer, and the like) about the content. The content distribution server 40 is a server device that distributes content to the terminal devices of the individual users according to demands from the individual terminal devices.

The WWW server 50 is a server that provides a website. By accessing the WWW server 50, the terminal devices of the individual users can display the website provided by the WWW server 50. The advertisement information provision server 60 is a server that provides various kinds of advertisement information. In the present embodiment, the advertisement information provided by the advertisement information provision server 60 is utilized in the SNS provided by the SNS system 10, and provided for the individual users utilizing the SNS. The recording reservation server 70 is a server that instructs a recording reservation of a program to the recording and reproducing device 260 to be described later.

The terminal devices 200a, 200b and 200c are devices such as a personal computer, a tablet terminal, a cellular phone, a smartphone, a portable music player, a game machine and the like for instance, and configured so as to utilize the SNS provided by the SNS system 10. In the present embodiment, as illustrated in FIG. 1, it is assumed that the terminal device 200a is the device utilized by a user A, the terminal device 200b is the device utilized by a user B, and the terminal device 200c is the device utilized by a user C, respectively.

In FIG. 1, three terminal devices 200a, 200b and 200c are illustrated; however, the number of the terminal devices is not limited to the example in the present disclosure. It is needless to say that the number of the terminal devices changes according to the number of users utilizing the SNS system 10. Also, in FIG. 1, it is illustrated such that one user uses one terminal device; however, the present disclosure is not limited to the example. One user may use the SNS provided by the SNS system 10 using the plurality of terminal devices.

The televisions 250a and 250b display television programs transmitted from broadcasting stations and content distributed from the content distribution server 40. The television programs transmitted from the broadcasting stations and the content distributed from the content distribution server 40 may be displayed not only on the televisions 250a and 250b but also on the terminal devices 200a, 200b and 200c. In the present embodiment, as illustrated in FIG. 1, it is assumed that the television 250a is the device utilized by the user A and the television 250b is the device utilized by the user B, respectively.

The recording and reproducing device 260 is a device that records the television programs transmitted from the broadcasting stations and the content distributed from the content distribution server 40, and reproduces the recorded television programs and content. The television programs and the content recorded by the recording and reproducing device 260 are displayed on the television 250a for instance when being reproduced. In the present embodiment, as illustrated in FIG. 1, the recording and reproducing device 260 is the device used by the user A. Also, the television 250a and the recording and reproducing device 260 may communicate with each other through a router 300 or may be connected to the network 2 to communicate with other devices connected to the network 2, for instance.

The entire configuration of the information processing system 1 according to one embodiment of the present disclosure has been described above using FIG. 1. Next, a functional configuration example of the plan sharing server 100 according to one embodiment of the present disclosure will be described.

[Configuration Example of Plan Sharing Server]

Figure 2:
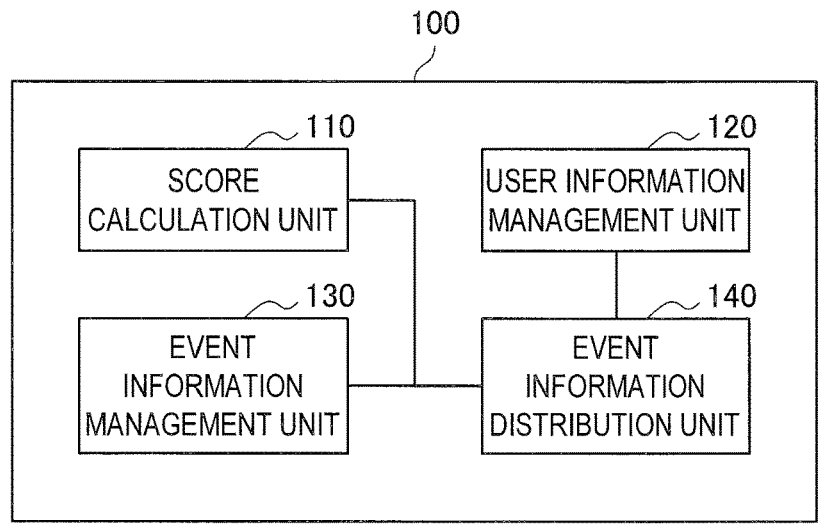
FIG. 2 is an explanatory diagram illustrating a functional configuration example of a plan sharing server 100 according to one embodiment of the present disclosure.

FIG. 2 is an explanatory diagram illustrating a functional configuration example of the plan sharing server 100 according to one embodiment of the present disclosure. Hereinafter, the functional configuration example of the plan sharing server 100 according to one embodiment of the present disclosure will be described using FIG. 2.

As illustrated in FIG. 2, the plan sharing server 100 according to one embodiment of the present disclosure includes a score calculation unit 110, a user information management unit 120, an event information management unit 130, and an event information distribution unit 140.

The score calculation unit 110 calculates scores using a predetermined calculation basis, for the events shared in the SNS by the individual users utilizing the SNS provided by the SNS system 10. Calculation of the scores for the events shared in the SNS by the individual users will be described later in detail. By calculating the scores by the score calculation unit 110 for the events shared in the SNS by the individual users, the information on the respective events can be efficiently shared by the individual users in the SNS provided by the SNS system 10.

The user information management unit 120 manages information on the individual users utilizing the SNS provided by the SNS system 10. Specifically, the user information management unit 120 manages a user ID used by the plan sharing server 100 that is set on the basis of a user ID of the SNS provided by the SNS system 10. The user information management unit 120 manages an operation history to the plan sharing server 100 of the individual users and manages profile information such as preferences and the like of the individual users set in the plan sharing server 100 by the user ID used by the plan sharing server 100. Thus, the user information management unit 120 can manage the original user information of the plan sharing server 100, which is different from the user information that can be managed in the SNS server 20.

The event information management unit 130 manages the information on the individual events provided from the information provision system 30. There are various kinds of information on the individual events provided from the information provision system 30. For instance, when the event is the television or radio program broadcasted from the broadcasting station or the content distributed from the content distribution server 40, the information on the event is the date and time of broadcasting the television/radio program or the content, the broadcasting channel (broadcasting frequency), the category, the performer, and the like. Also, when the event is the event to be carried out in a real world such as a concert, a sports event and the like, the information on the event is the date and time of holding the event, a place for holding the event, the performer, a match card, a player scheduled to appear, a starting pitcher when a game is baseball, scoring situations, and the like.

The event information distribution unit 140 is one example of an event presentation unit of the present disclosure, and provides the information on the individual events managed by the event information management unit 130 for the individual users utilizing the SNS provided by the SNS system 10. The event information distribution unit 140 uses the original user information of the plan sharing server 100 managed by the user information management unit 120 when distributing the information on the event. Then, the event information distribution unit 140 performs sorting and presentation on the basis of the scores calculated by the score calculation unit 110 when presenting the information on the individual events managed by the event information management unit 130.

The plan sharing server 100 according to one embodiment of the present disclosure has the configuration illustrated in FIG. 2 and is thus capable of efficiently managing the events shared by the individual users utilizing the SNS provided by the SNS system 10 in the SNS by cooperation with the SNS server 20. In the present embodiment, the score calculation unit 110, the user information management unit 120, the event information management unit 130 and the event information distribution unit 140 illustrated in FIG. 2 are included inside the plan sharing server 100; however, the present disclosure is not limited to the example. These elements may be included inside a single device as illustrated in FIG. 2 or may be provided separately in different devices.

The functional configuration example of the plan sharing server 100 according to one embodiment of the present disclosure has been described above using FIG. 2. Next, a functional configuration example of the SNS server 20 according to one embodiment of the present disclosure will be described.

[Configuration Example of SNS Server]

Figure 3:
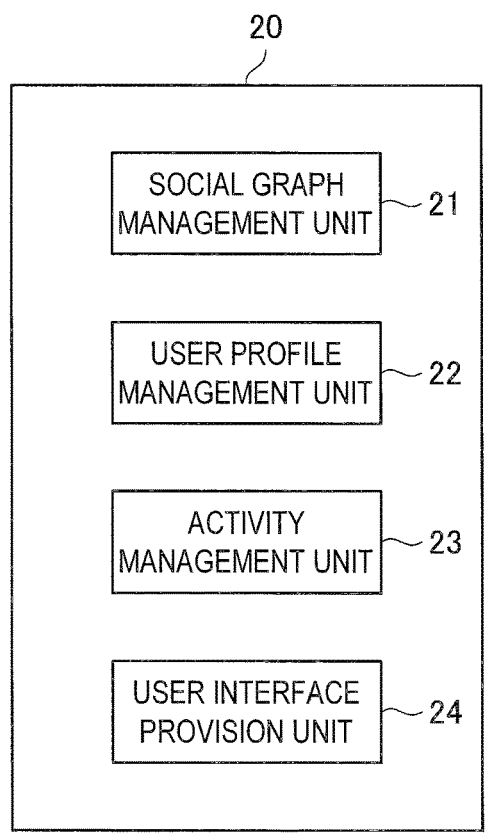
FIG. 3 is an explanatory diagram illustrating a functional configuration example of an SNS server 20 according to one embodiment of the present disclosure.

FIG. 3 is an explanatory diagram illustrating a functional configuration example of the SNS server 20 according to one embodiment of the present disclosure. Hereinafter, the functional configuration example of the SNS server 20 according to one embodiment of the present disclosure will be described using FIG. 3.

As illustrated in FIG. 3, the SNS server 20 according to one embodiment of the present disclosure includes a social graph management unit 21, a user profile management unit 22, an activity management unit 23, and a user interface provision unit 24.

The social graph management unit 21 manages correlations of the individual users and connections of the users in the SNS provided by the SNS server 20. The user profile management unit 22 manages profiles (information on a name, a nickname, hobbies, and the like, for instance) of the individual users utilizing the SNS provided by the SNS server 20. The activity management unit 23 manages activities (action records) from the individual users in the SNS provided by the SNS server 20. In the present embodiment, the activity management unit 23 manages the activities (plan sharing activities) to the plan sharing actions registered by the individual users. The plan sharing activities are various activities to the content registered in the plan sharing actions. The user interface provision unit 24 provides a GUI of the SNS provided by the SNS server 20. The GUI provided by the user interface provision unit 24 is displayed by a browser or an exclusive application executed in the individual terminal devices, for instance. Also, the GUI provided by the user interface provision unit 24 is appropriately generated using the information managed respectively by the social graph management unit 21, the user profile management unit 22 and the activity management unit 23 and the information managed by the plan sharing server 100.

The SNS server 20 according to one embodiment of the present disclosure provides the SNS by having the configuration illustrated in FIG. 3. Then, the SNS server 20 according to one embodiment of the present disclosure can manage the connections of the individual users and the activities of the individual users by having the configuration illustrated in FIG. 3. Then, the SNS server 20 according to one embodiment of the present disclosure allows the individual users to share the information on the events in the SNS by cooperation with the plan sharing server 100.

Also, in the present embodiment, the social graph management unit 21, the user profile management unit 22 and the activity management unit 23 illustrated in FIG. 3 are included inside the SNS server 20; however, the present disclosure is not limited to the example. These elements may be included inside a single device as illustrated in FIG. 3 or may be provided separately in different devices.

The functional configuration example of the SNS server 20 according to one embodiment of the present disclosure has been described above using FIG. 3. Next, a functional configuration example of the information provision system 30 according to one embodiment of the present disclosure will be described.

[Configuration Example of Information Provision System]

Figure 4:
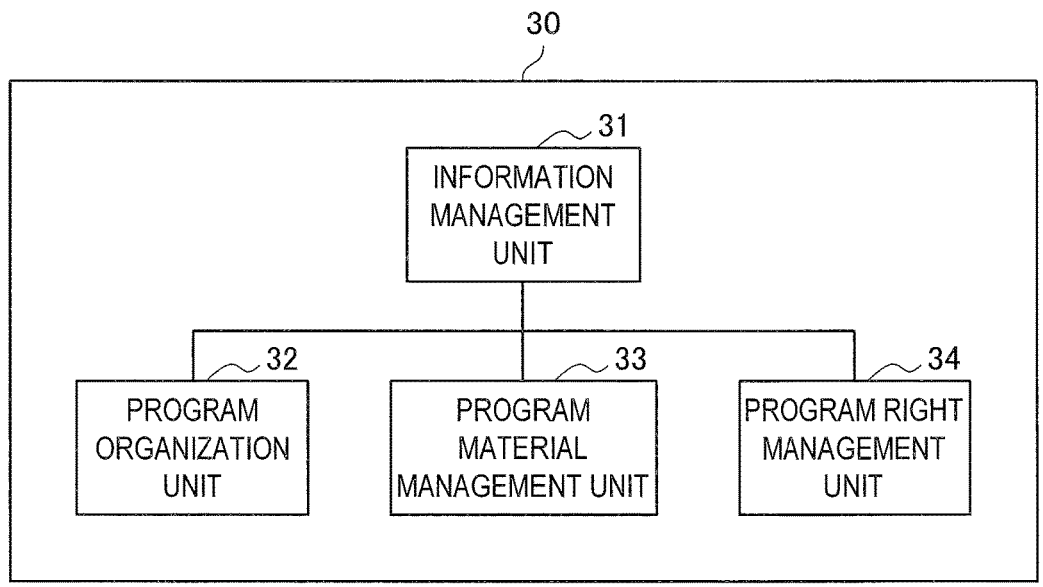
FIG. 4 is an explanatory diagram illustrating a functional configuration example of an information provision system 30 according to one embodiment of the present disclosure.

FIG. 4 is an explanatory diagram illustrating a functional configuration example of the information provision system 30 according to one embodiment of the present disclosure. Hereinafter, the functional configuration example of the information provision system 30 according to one embodiment of the present disclosure will be described using FIG. 4.

As illustrated in FIG. 4, the information provision system 30 according to one embodiment of the present disclosure includes an information management unit 31, a program organization unit 32, a program material management unit 33, and a program right management unit 34.

The information management unit 31 manages the information related to the events. The information related to the events managed by the information management unit 31 is provided for the plan sharing server 100 as needed.

The program organization unit 32 organizes the television program in the case that the information provision system 30 provides the information about the television program. The program organization unit 32 organizes the television program so that the information on the television program is managed in the information management unit 31. The program material management unit 33 manages program materials used in the television program when the television program is organized in the program organization unit 32. The program right management unit 34 manages a right of the television program when the television program is organized in the program organization unit 32.

The information provision system 30 may be provided for every event provider such as every broadcasting station or every content distribution provider, for instance, or may be provided for each of the plurality of event providers. The information provision system 30 has the configuration illustrated in FIG. 4, and is thus capable of appropriately providing the plan sharing server 100 with the information on the events.

The functional configuration example of the information provision system 30 according to one embodiment of the present disclosure has been described above using FIG. 4. Next, a functional configuration example of the terminal device 200a according to one embodiment of the present disclosure will be described.

[Configuration Example of Terminal Device]

Figure 5:
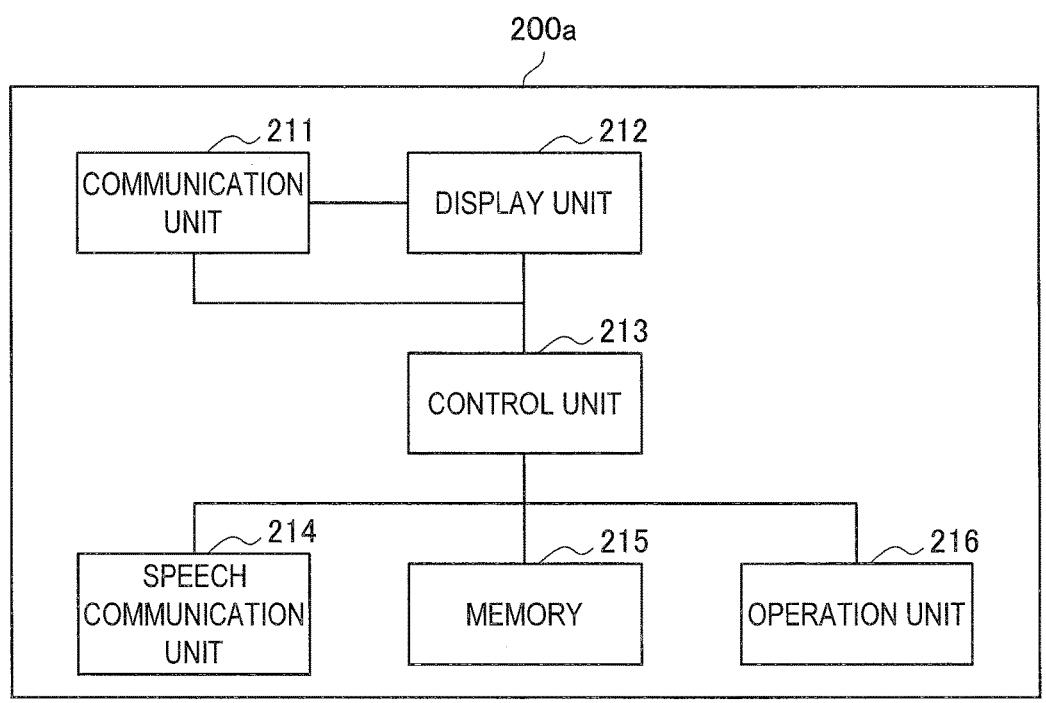
FIG. 5 is an explanatory diagram illustrating a functional configuration example of a terminal device 200a according to one embodiment of the present disclosure.

FIG. 5 is an explanatory diagram illustrating a functional configuration example of the terminal device 200a according to one embodiment of the present disclosure. Here, only the terminal device 200a is illustrated among the terminal devices 200a, 200b and 200c illustrated in FIG. 1. Since the other terminal devices 200b and 200c have the configuration similar to the terminal device 200a, only the terminal device 200a will be described here. Hereinafter, the functional configuration example of the terminal device 200a according to one embodiment of the present disclosure will be described using FIG. 5.

As illustrated in FIG. 5, the terminal device 200a according to one embodiment of the present disclosure includes a communication unit 211, a display unit 212, a control unit 213, a speech communication unit 214, a memory 215, and an operation unit 216.

The communication unit 211 performs communication with other devices through the network. The display unit 212 displays information received by the communication unit 211 and information according to an operation by the user performed to the operation unit 216. The display unit 212 is constituted of a planar type image display panel such as a liquid crystal display or an organic EL display, for instance. Also, the display unit 212 may be provided with a touch panel.

The control unit 213 controls the operation of the terminal device 200. For instance, the control unit 213 controls the operation of the terminal device 200 by executing a program stored in the memory 215. As the control of the operation of the terminal device 200 by the control unit 213, for instance, there are communication control of the communication unit 211, display control of the information on the display unit 212, and the like. Therefore, the control unit 213 is one example of a display control unit of the present disclosure.

The speech communication unit 214 is constituted of a speaker and a microphone for instance, and executes speech communication by voice with another information processing device or a telephone set. The memory 215 is constituted of a read only memory (ROM), a random access memory (RAM) or the like for instance, and is used for storing a program for controlling the operation of the terminal device 200 or the like. The operation unit 216 is constituted of a button for operating the terminal device 200. According to the operation of the operation unit 216, the operation of the terminal device 200a is controlled by the control unit 213. Also, in the case that the display unit 212 is provided with a touch panel, the touch panel is also a part of the operation unit 216.

The functional configuration example of the terminal device 200a according to one embodiment of the present disclosure has been described above using FIG. 5. Next, an operation of the information processing system 1 according to one embodiment of the present disclosure will be described.

[Operation Example of Information Processing System]

First, an outline of the operation of the information processing system 1 according to one embodiment of the present disclosure will be described in comparison with sharing of information in a conventional SNS.

Figure 6:
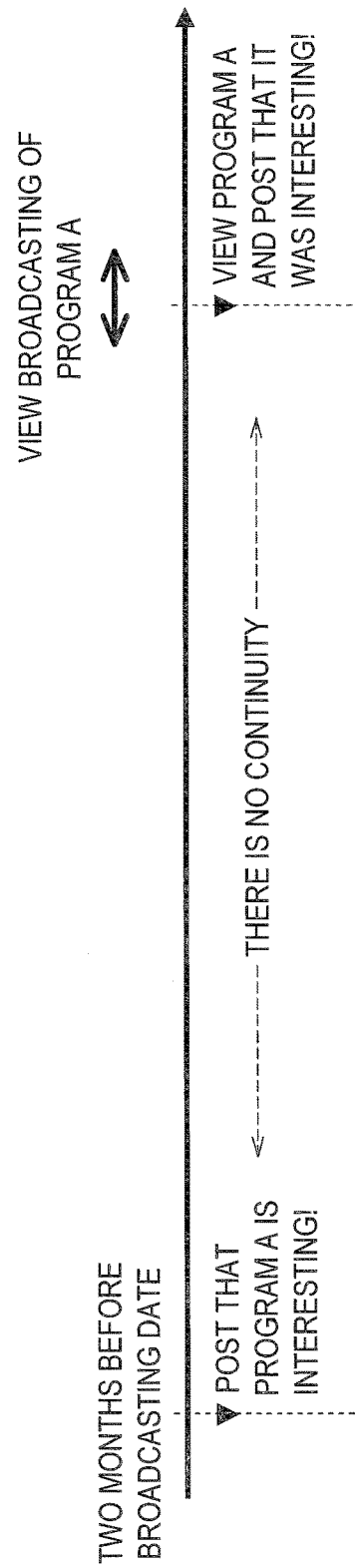
FIG. 6 is an explanatory diagram illustrating an outline of sharing of information in a conventional SNS.

FIG. 6 is an explanatory diagram illustrating an outline of sharing of information in a conventional SNS. FIG. 6 illustrates the outline of the sharing of the information on a certain television program in the case that a certain user posts the information about the television program on the SNS, in the conventional SNS.

For instance, it is assumed that, about a certain program A, a certain user has posted on the SNS that "the program A is interesting!" two months before a broadcasting date. Another user who is a friend on the SNS and can share the information with the user can share the content posted about the program A by browsing the content posted by the user about the program A.

Then, it is assumed that the broadcasting date of the program A has come and the user who actually viewed the program A has posted on the SNS that "the program A was interesting!" Another user who is a friend on the SNS can share the content posted about the program A by browsing the content posted by the user about the program A.

However, in the conventional SNS, about the certain program A, there is no relation between the content posted two months before the broadcasting date and the content posted around the broadcasting date. That is, in the conventional SNS, there is no continuity in the content posted about the event, and posting has to be performed many times about the same event. Therefore, in the conventional SNS, even when posting is performed on the SNS about the event before the start time of the event, it is troublesome to find the content posted in the past or the content is no longer popular because a long time has passed when the start time of the event comes.

Figure 7:
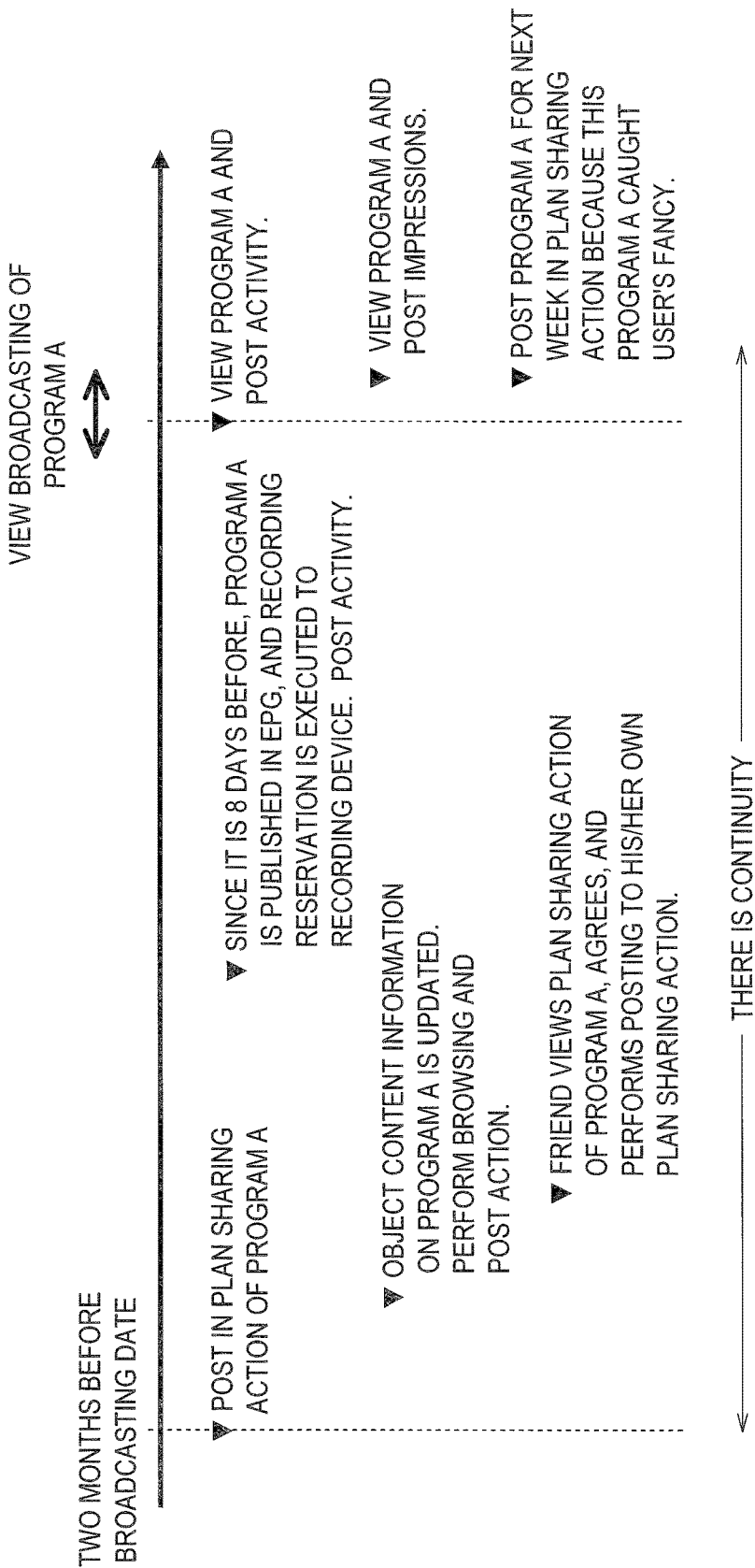
FIG. 7 is an explanatory diagram illustrating an outline of an operation of the information processing system 1 according to one embodiment of the present disclosure.

FIG. 7 is an explanatory diagram illustrating an outline of the operation of the information processing system 1 according to one embodiment of the present disclosure. The information processing system 1 according to one embodiment of the present disclosure solves the above-described inconvenience in the conventional SNS, and makes it possible to, when posting is performed about the event, provide continuity in a topic with the event as a key.

For instance, it is assumed that, about the certain program A, a certain user has posted on the SNS provided by the SNS system 10 that "the program A is interesting!" two months before a broadcasting date in "plan sharing action". The content posted in "plan sharing action" about the certain program A by the certain user are managed in the plan sharing server 100, and can be shared by other users who are friends on the SNS provided by the SNS system 10. A display example of the content posted in "plan sharing action" by the individual users will be described later in detail.

The event posted in "plan sharing action" by the individual users is managed in the plan sharing server 100, and when the information on the event is updated in the information provision system 30, the update is reflected in the plan sharing server 100. The information on the event updated in the information provision system 30 is managed in the event information management unit 130.

For instance, when object content information (the performer or the like) on the program A posted in "plan sharing action" of the SNS provided by the SNS system 10 by the individual user is updated in the information provision system 30, the updated information is reflected in the plan sharing server 100. The individual user of the SNS can browse the information about the program A posted in "plan sharing action", and further post the action about the program A. The action that can be posted by the individual user will be described later in detail.

Also, for instance, a friend on the SNS of a certain user, who has viewed the program A posted by the user in "plan sharing action" of the SNS provided by the SNS system 10, can judge and agree that the program A seems interesting and make a posting in his/her own "plan sharing action".

Also, for instance, since a program is registered in an electronic program guide (EPG) and a recording reservation and a viewing reservation become possible eight days before a broadcasting date in current digital broadcasting, the user who plans to view the program A executes the recording reservation of the program A to a recording device eight days before the broadcasting date or thereafter, and posts the activity to the SNS provided by the SNS system 10.

Then, when the broadcasting date of the program A comes, in the information processing system 1 according to one embodiment of the present disclosure, it becomes possible to post the activity or post impressions on the SNS by the individual users for the program A posted in "plan sharing action". Also, when a certain user likes the program A, the program A to be broadcasted next week can be posted in "plan sharing action".

In such a manner, in the information processing system 1 according to one embodiment of the present disclosure, the individual user can share the content posted in "plan sharing action" of the SNS provided by the SNS system 10 about the event among the users who are friends on the SNS with the user. The user who is a friend on the SNS can view the content of the event posted in "plan sharing action" by the other users and reflect them on his/her own action to the SNS.

Figure 8:
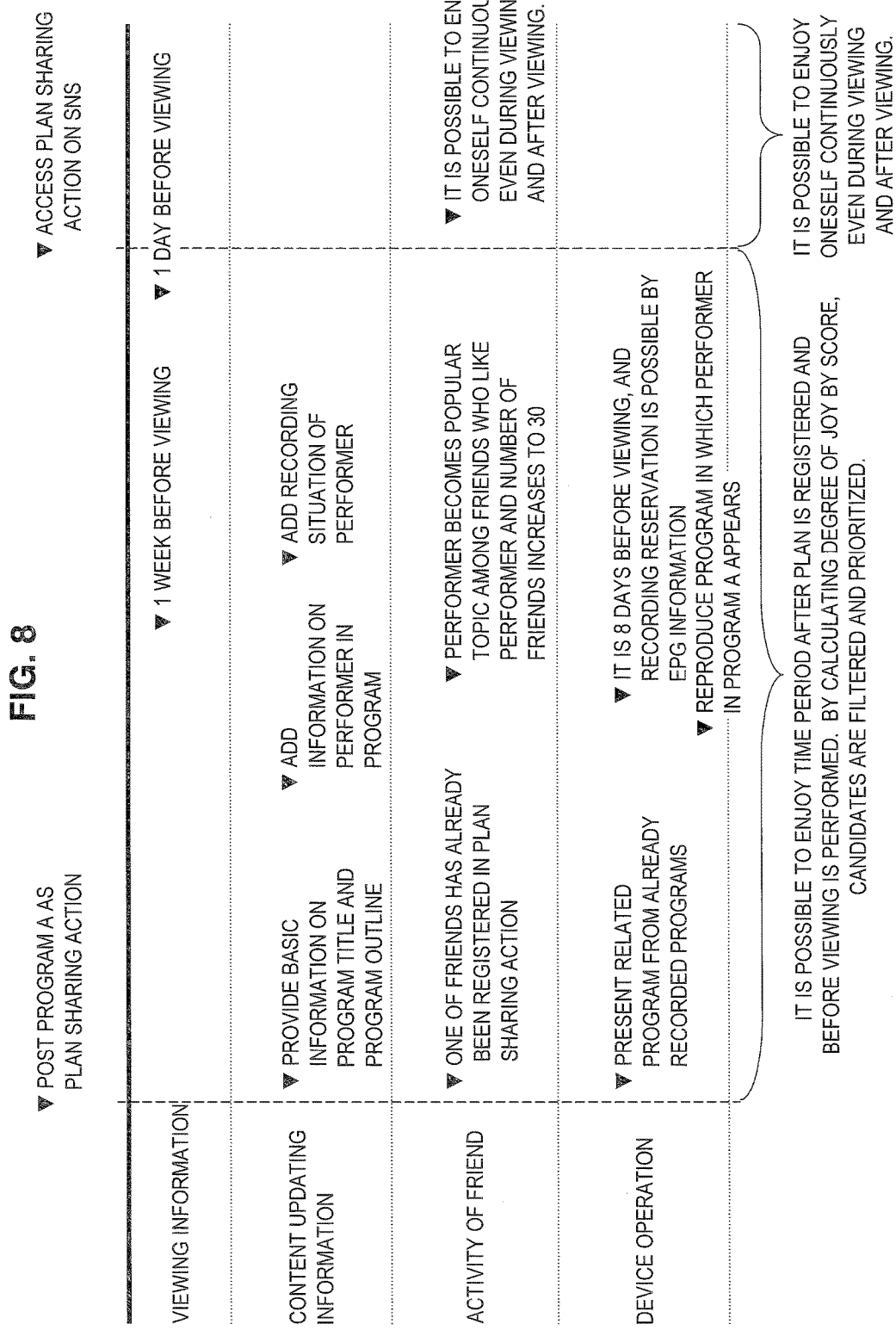
FIG. 8 is an explanatory diagram illustrating an example of an activity on an SNS by a plan sharing action.

FIG. 8 is an explanatory diagram illustrating an example of the activity on the SNS in the plan sharing action, in the information processing system 1 according to one embodiment of the present disclosure. In FIG. 8, examples of the activity on the SNS by the plan sharing action are viewing information on a program, content updating information, the activity of friends, and a device operation.

For instance, when a certain user posts the program A in the plan sharing action, the plan sharing server 100 requests the information on the program A to the information provision system 30. The information provision system 30 which receives the request acquires the information on the program A and returns it to the plan sharing server 100. Also, when the information about the program A is added, the information on the program A is appropriately provided for the plan sharing server 100. FIG. 8 shows information on the performer in the program and a recording situation of the performer as examples of the added information about the program A. Of course, the information about the program A is not limited to the examples.

In FIG. 8, examples of the activity of friends for the event are the case that, when a certain user posts the program A as the plan sharing action, one of the friends of the user registers the program A to the plan sharing action, and the case that the information on the performer in the program A is added, the program A becomes a popular topic among the friends who like the performer, and the number of the friends who have registered in the plan sharing action increases to 30. Also, in the information processing system 1 according to one embodiment of the present disclosure, by sharing the program A in the plan sharing action, even during the broadcasting of the program A or after the end of the broadcasting, the program A can be continuously enjoyed among the users who have shared it. The activity of the friends for the event is not limited to the examples.

In FIG. 8, examples of the device operation for the event are the case that, when a certain user posts the program A as the plan sharing action, the user (who may be the user who has performed posting or may be a friend of the user) reproduces the program related to the program A from already recorded programs, the case that, after the information on the performer in the program A is added, the program in which the performer appears is reproduced, and the case that it becomes eight days before the broadcasting of the program A and the recording reservation becomes possible by EPG information. Of course, the device operation for the event is not limited to the examples.

In such a manner, the information processing system 1 according to one embodiment of the present disclosure can provide joy in a period after a viewing plan of the program A is registered by a certain user until the program A is actually viewed for instance, by the activity on the SNS in the plan sharing action. Then, the information processing system 1 according to one embodiment of the present disclosure calculates a degree of joy for the individual events by a score using a predetermined calculation basis. The information processing system 1 according to one embodiment of the present disclosure performs filtering and prioritization of candidates by calculating the score for the individual events. In the present embodiment, the score is used in management of a priority order of the events displayed in a plan sharing action display area to be described later.

The outline of the operation of the information processing system 1 according to one embodiment of the present disclosure has been described above. Subsequently, an operation example of the information processing system 1 according to one embodiment of the present disclosure will be described more specifically.

Figure 9:
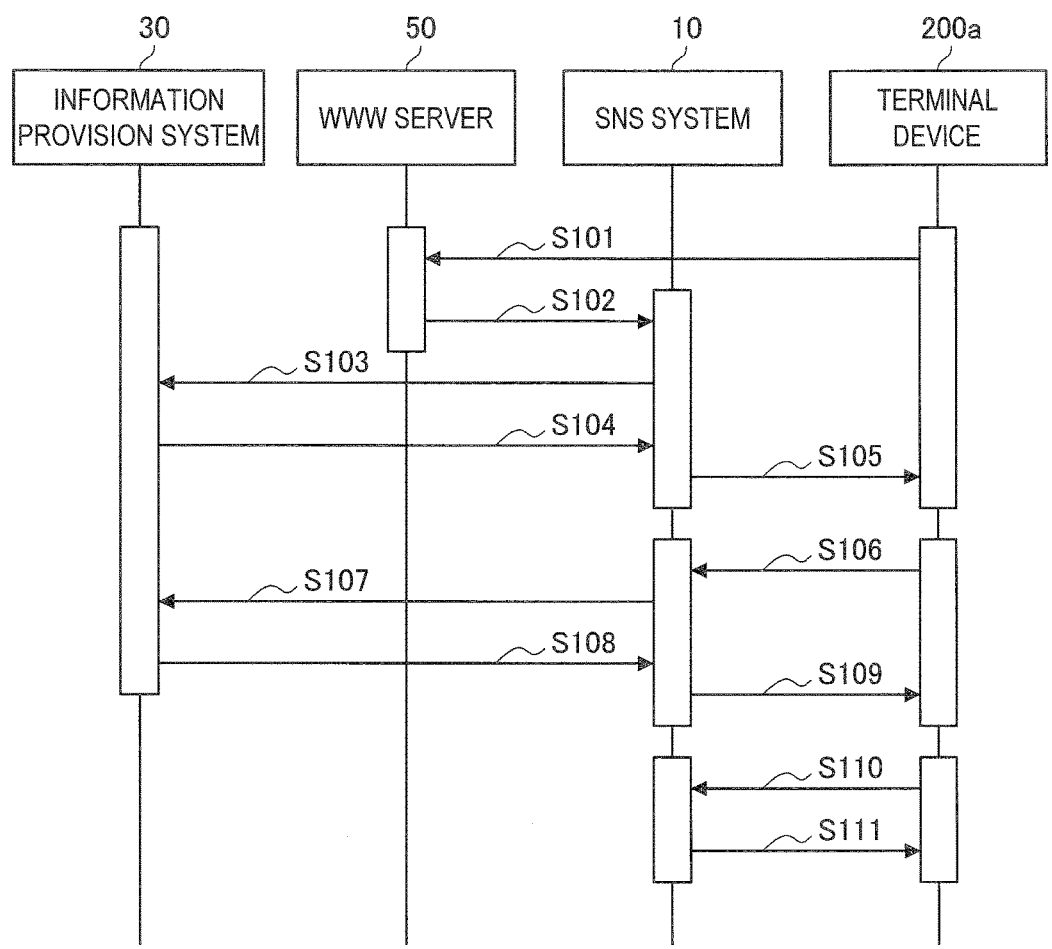
FIG. 9 is a flowchart illustrating an operation example of the information processing system 1 according to one embodiment of the present disclosure.

FIG. 9 is a flowchart illustrating an operation example of the information processing system 1 according to one embodiment of the present disclosure. FIG. 9 illustrates the operation example of the information processing system 1 according to one embodiment of the present disclosure when registering the event which is the plan sharing action from the terminal device 200*a* of the user A utilizing the SNS provided by the SNS system 10. In the description below, one example of the event is a program broadcasted on television. Hereinafter, the operation example of the information processing system 1 according to one embodiment of the present disclosure will be described using FIG. 9.

The user A browses a monthly magazine or a website introducing broadcasting programs in the future, and when there is the program A that the user likes, executes the plan sharing action using the terminal device 200*a*. Here, the case of browsing the website provided by the WWW server 50 using the terminal device 200*a* and executing the plan sharing action from the website is illustrated. The terminal device 200*a* accesses the website provided by the WWW server 50 on the basis of the operation by the user A, and executes the plan sharing action from the website (step S101). An example of a graphical user interface (GUI) for executing the plan sharing action from the website provided by the WWW server 50 will be described later in detail.

The WWW server 50 instructs registration of the plan sharing action for the program A to the SNS system 10 according to the execution of the plan sharing action from the terminal device 200*a* (step S102). Upon receiving the registration instruction of the plan sharing action for the program A from the WWW server 50, the SNS system 10 acquires an event ID of the program A from the information provision system 30 (step S103). The information provision system 30 specifies the program A, acquires the event ID set to the program A, and returns the fact that the event ID has been normally acquired to the SNS system 10 (step S104). Upon acquiring the event ID from the information provision system 30, the SNS system 10 registers the plan sharing action for the program A using the event ID, and makes the terminal device 200*a* display the fact that registration has been normally performed (step S105).

When the user utilizing the SNS provided by the SNS system 10 is to execute the plan sharing action for the program A, other than the case through the website as described above, a case through a page introducing the program A in the SNS system 10 for instance can be considered.

The terminal device 200*a* accesses the SNS system 10 on the basis of the operation by the user A, and executes the plan sharing action from the page introducing the program A in the SNS system 10 (step S106). The SNS system 10 acquires the event ID of the program A from the information provision system 30 according to the execution of the plan sharing action from the terminal device 200*a* (step S107). The information provision system 30 specifies the program A, acquires the event ID set to the program A, and returns the fact that the event ID has been normally acquired to the SNS system 10 (step S108). Upon acquiring the event ID from the information provision system 30, the SNS system 10 registers the plan sharing action for the program A using the event ID, and makes the terminal device 200*a* display the fact that registration has been normally performed (step S109). More specifically, when the plan sharing action is executed from the terminal device 200*a*, the plan sharing server 100 acquires the event ID of the program A to be the object of the plan sharing action from the information provision system 30, and manages the event ID of the program A in the event information management unit 130. Then, the SNS server 20 makes the terminal device 200*a* display the fact that the plan sharing action for the program A has been normally registered.

The SNS system 10 can present the plan sharing action registered by the individual user. The terminal device 200*a* accesses the SNS system 10 on the basis of the operation by the user A, and requests display of the plan sharing action registered by the individual user (step S110). In response to the request from the terminal device 200*a*, the SNS system 10 makes the terminal device 200*a* display the registered plan sharing action (step 5111). The individual user can view the plan sharing action displayed at the terminal device 200*a* by the SNS provided by the SNS system 10, and confirm the plan in the future.

Figure 10:
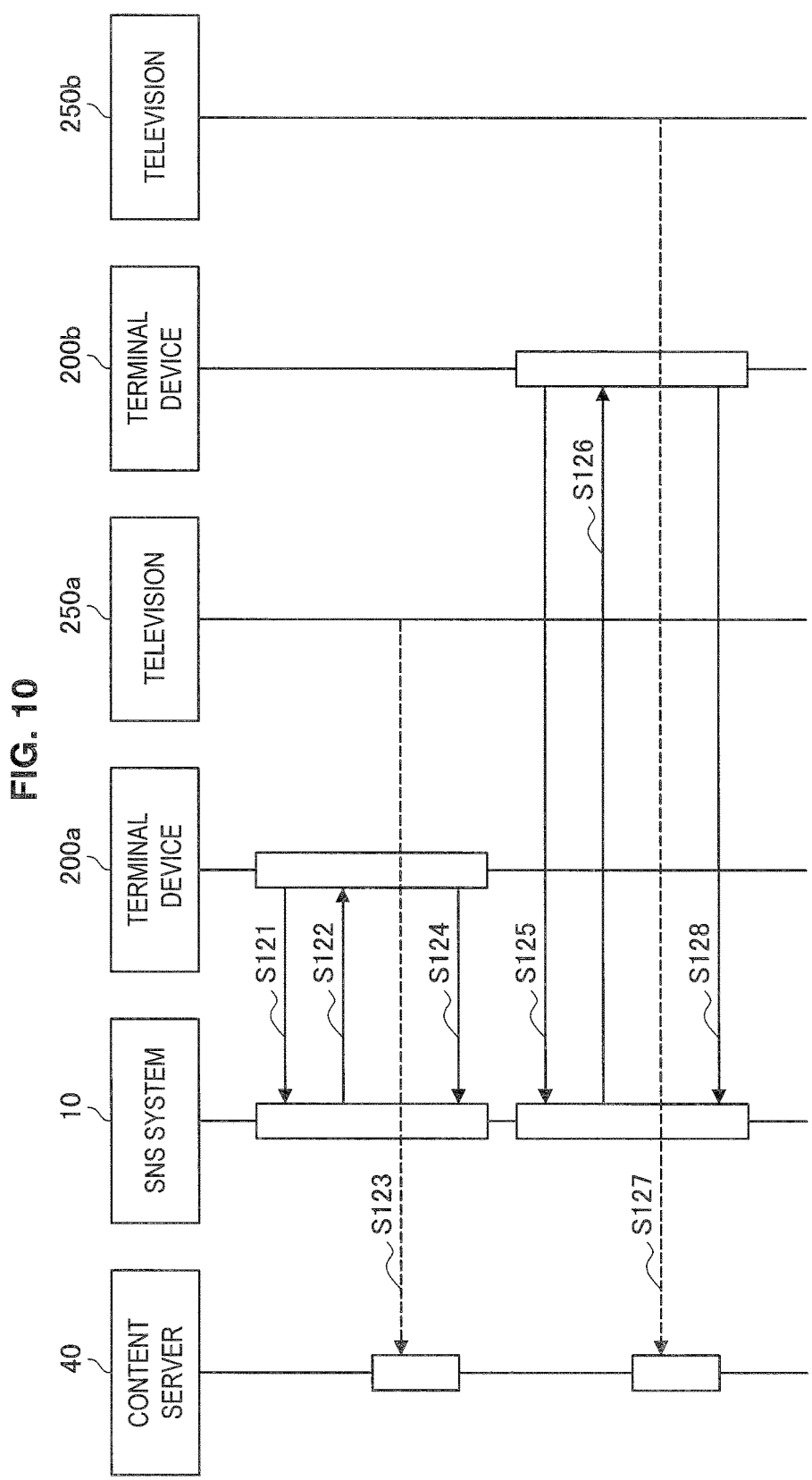
FIG. 10 is a flowchart illustrating an operation example of the information processing system 1 according to one embodiment of the present disclosure.

FIG. 10 is a flowchart illustrating an operation example of the information processing system 1 according to one embodiment of the present disclosure. FIG. 10 illustrates an example of a basic operation for the plan sharing action registered by the individual user. Hereinafter, the operation example of the information processing system 1 according to one embodiment of the present disclosure will be described using FIG. 10.

The terminal device 200*a* requests acquisition of the plan sharing action registered in the SNS system 10 on the basis of the operation by the user A (step S121). Here, the terminal device 200*a* requests the plan sharing server 100 to acquire 10 pieces of the events with high scores from the plan sharing action registered in the plan sharing server 100 of the SNS system 10.

The SNS system 10 acquires 10 pieces of the events with high scores from the registered plan sharing action from the plan sharing server 100 in response to the request from the terminal device 200*a* in the step S121, and returns the information related to the events to the terminal device 200*a* (step S122). The user A can view the events with the high score in the registered plan sharing action, which is returned from the SNS system 10 to the terminal device 200A, and reflect it on his/her own plan.

For instance, in the case that the event with the highest score is the content which is currently being distributed from the content distribution server 40 or is about to be distributed, the user A can view the content using the television 250*a* (step S123). Then, the user A can execute the activity indicating that the content is being viewed by using the terminal device 200*a* (S124). When the user A executes the activity indicating that the content is being viewed, the content is reflected on the action history of the user and is turned to the state of being sharable among the friends.

Also, another user B can, when accessing the SNS system 10 (step S125), recognize that the user A is viewing the content by the activity in the step S124 (step S126). If interested in the content being viewed by the user A, the user B can view the content using the television 250*a* (step S127). Also, if the user B likes the content having viewed using the television 250*a* in step S127, the user B can access the SNS system 10 using the terminal device 200*b* and register to the plan sharing action (step S128).

Figure 11:
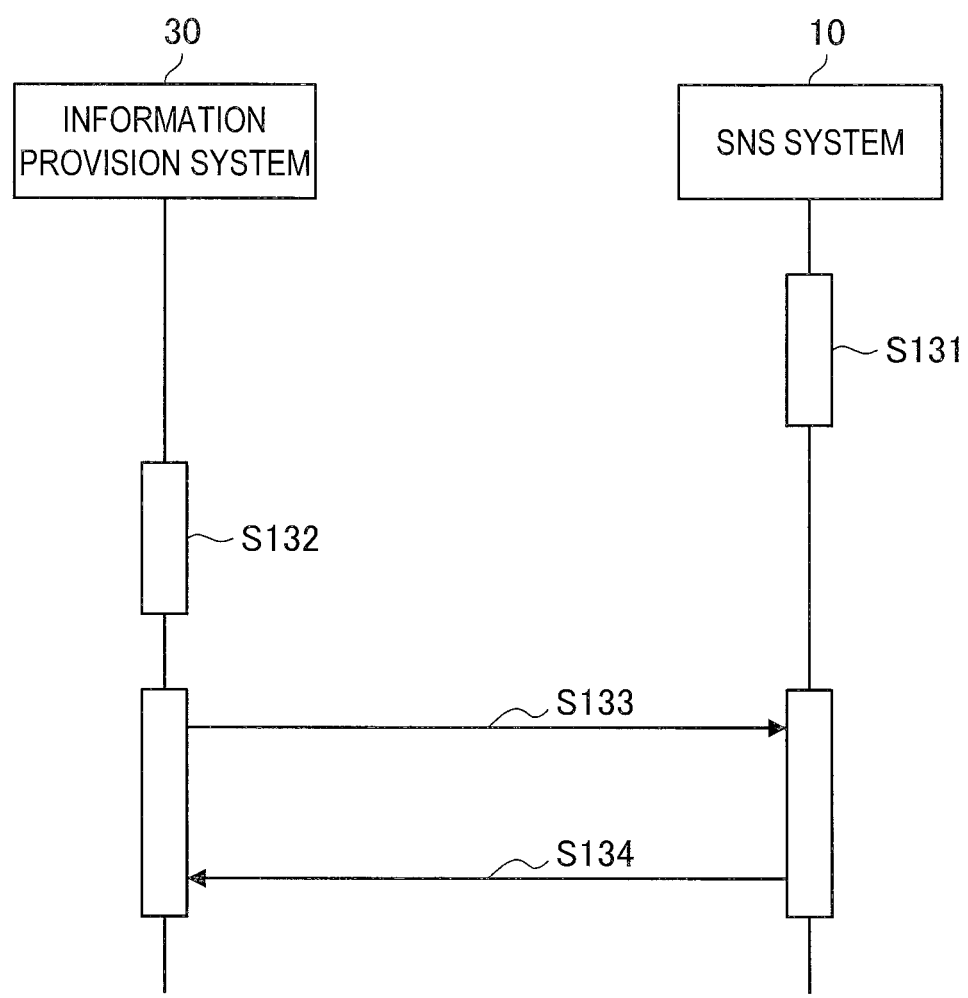
FIG. 11 is a flowchart illustrating an operation example of the information processing system 1 according to one embodiment of the present disclosure.

FIG. 11 is a flowchart illustrating an operation example of the information processing system 1 according to one embodiment of the present disclosure. FIG. 11 illustrates an example of updating the score by periodical batch processing. Hereinafter, the operation example of the information processing system 1 according to one embodiment of the present disclosure will be described using FIG. 11.

The SNS system 10 recalculates the score of the event registered in the plan sharing action periodically or at a specific timing, on the basis of the update of the information on the event, a tendency on the SNS of the user who is a friend, an operation situation of the device, the date and time of the event, and the like (step S131). Also, when the update of the information occurs about the event that is managed, the information provision system 30 updates the information about the event which is an object of the update (step S132). The case that the update of the information occurs about the event is determination of a performer of the television program or the content, release of an interview article of the performer, presentation of a preannounced starting pitcher of an object game if the television program or the content is professional baseball relay broadcast (and when the event is going to a professional baseball game), and the like. Also, if the professional baseball relay broadcast is being broadcasted, a change in a scoring situation of the game, a change in a situation of participating players, and the like are also included in the case that the update of the information occurs about the event.

When the information is updated about the event that is managed, the information provision system 30 notifies the SNS system 10 of the fact that the information on the event which is the object of the plan sharing action managed in the plan sharing server 100 has been updated (step S133). The notified SNS system 10 recalculates the score on the basis of the update of the information in the score calculation unit 110 of the plan sharing server 100, and returns the fact that processing has been normally completed to the information provision system 30.

The plan sharing server 100 can turn the score of the event which is the object of the plan sharing action to the latest state at all times by recalculating the score in the score calculation unit 110 periodically or at a timing at which the information on the event is updated.

Figure 12:
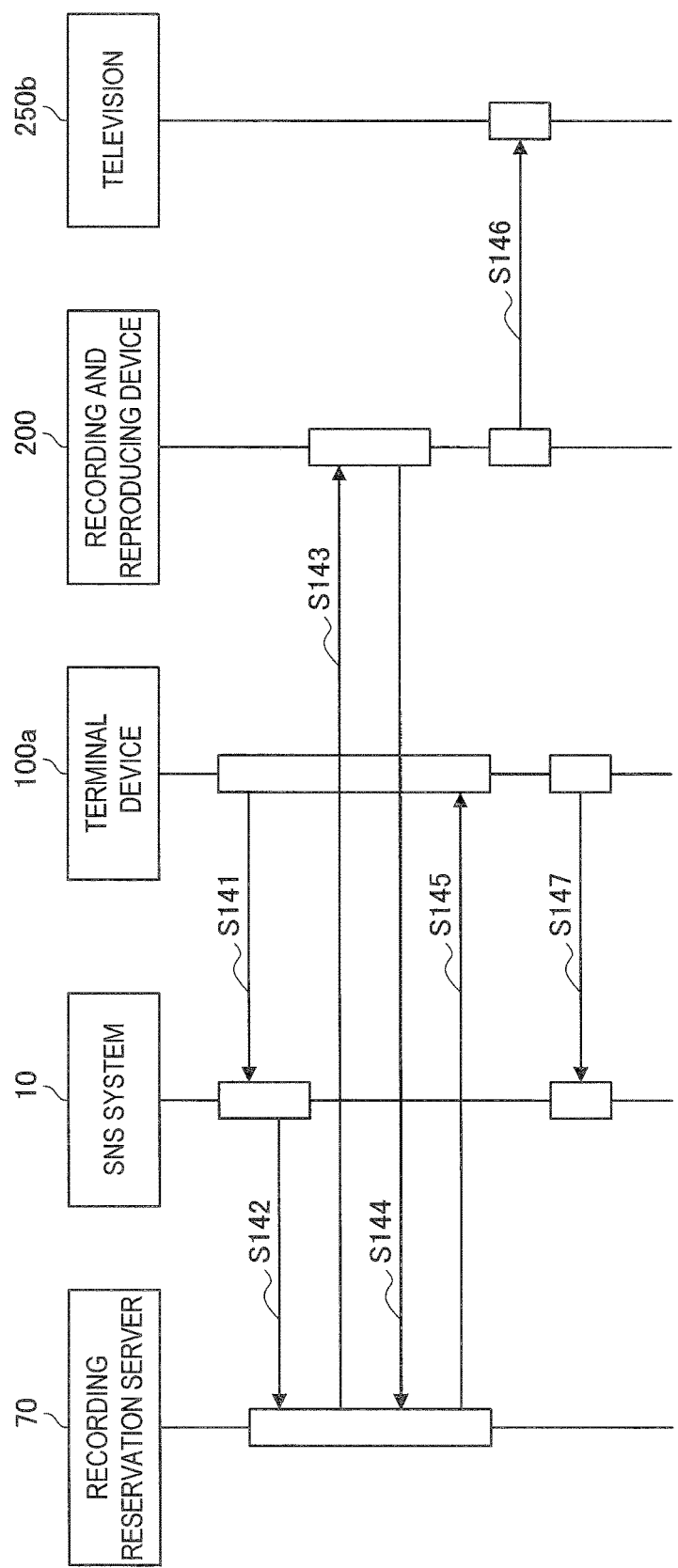
FIG. 12 is a flowchart illustrating an operation example of the information processing system 1 according to one embodiment of the present disclosure.

FIG. 12 is a flowchart illustrating an operation example of the information processing system 1 according to one embodiment of the present disclosure. FIG. 12 illustrates an example of executing the recording reservation of the program which is the object of the plan sharing action. Hereinafter, the operation example of the information processing system 1 according to one embodiment of the present disclosure will be described using FIG. 12.

The user A accesses the SNS system 10 using the terminal device 200a (step S141), and when the user recognizes that the program registered in the plan sharing action is registered in the EPG, executes the activity of the recording reservation to the SNS system 10. The SNS system 10 which has received the activity of the recording reservation from the user A manages the activity in the activity management unit 23, and also instructs the recording reservation server 70 to which the user A is registered to make a recording reservation of the program to the recording and reproducing device 260 owned by the user A (step S142).

The recording reservation server 70 makes the recording reservation of the program to the registered recording and reproducing device 260 (step S143). When the recording reservation is normally completed, the recording and reproducing device 260 returns the fact that the recording reservation has been normally completed to the recording reservation server 70 (step S144). Upon receiving the fact that the recording reservation is normally completed, the recording reservation server 70 transmits the fact that the recording reservation to the recording and reproducing device 260 has been normally completed to the terminal device 200a (step S145).

Thereafter, when the program is recorded on the basis of the recording reservation in the recording and reproducing device 260, the user A can view the program recorded by the recording and reproducing device 260 on the television 250a (step S146). Then, when the program is viewed, the user A can post a comment about the program in the plan sharing action on the SNS system 10 (step S147).

Figure 13:
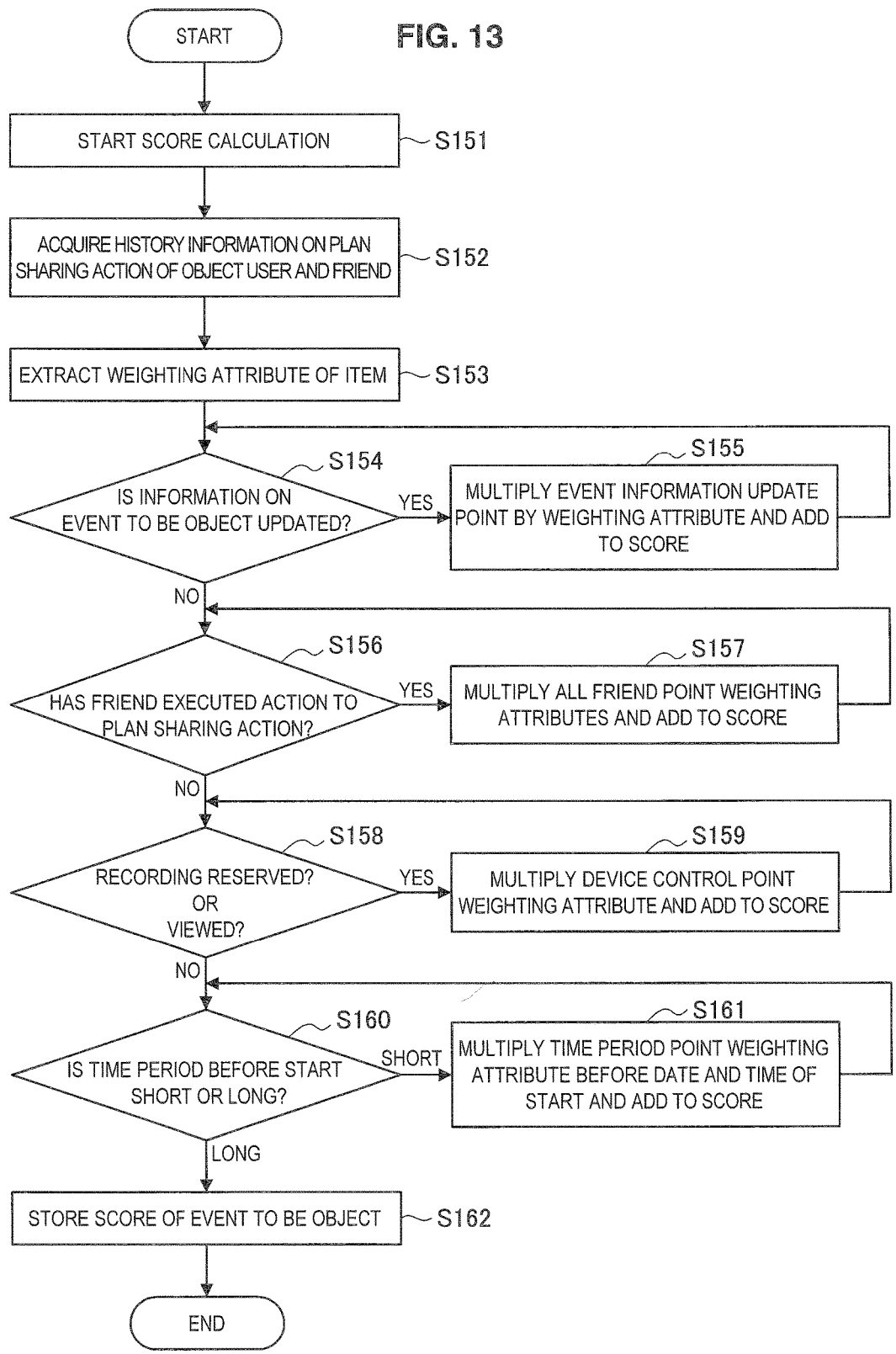
FIG. 13 is a flowchart illustrating one example of an operation algorithm of the plan sharing server 100 according to one embodiment of the present disclosure.

Next, one example of an operation algorithm of the plan sharing server 100 according to one embodiment of the present disclosure will be described. FIG. 13 is a flowchart illustrating one example of the operation algorithm of the plan sharing server 100 according to one embodiment of the present disclosure. FIG. 13 illustrates one example of the operation algorithm of the plan sharing server 100 when calculating the score in the score calculation unit 110 for the plan sharing action registered in the plan sharing server 100. Hereinafter, one example of the operation algorithm of the plan sharing server 100 according to one embodiment of the present disclosure will be described using FIG. 13.

In the present embodiment, the plan sharing server 100 calculates the score in units of the event registered in the plan sharing action in the score calculation unit 110. Then, in the present embodiment, the plan sharing server 100 calculates the score in the score calculation unit 110 using four items that are the date and time of the start of the event information specified in the plan sharing action, the date and time of the update of the event information specified in the plan sharing action, the activity of friends for the event information specified in the plan sharing action, and device control in the event information specified in the plan sharing action. The plan sharing server 100 defines a value for which the scores of the four items are added as the score of the event registered in the plan sharing action. As the score calculated in the score calculation unit 110 is higher, a possibility that the event is displayed in high order of the plan sharing action display area to be described later becomes higher.

Then, the plan sharing server 100 performs weighting according to the state of the four items when calculating the score in the score calculation unit 110. In the case of using the date and time of the start and the date and time of the end of the event information specified in the plan sharing action in score calculation in the score calculation unit 110, the plan sharing server 100 makes the score be higher as a time period between the date and time of the start or the date and time of the end and the present date and time is shorter. In the case of using the date and time of the update of the event information specified in the plan sharing action in the score calculation in the score calculation unit 110, the plan sharing server 100 makes the score be higher as a time period between the date and time of the update and the present date and time is shorter. In the case of using the activity of friends for the event information specified in the plan sharing action in the score calculation in the score calculation unit 110, the plan sharing server 100 makes the score be higher as the number of the activities is larger. In the case of using the device control in the event information specified in the plan sharing action in the score calculation in the score calculation unit 110, the plan sharing server 100 makes the score be higher as the number of actions to the device is larger like the number of times of reproducing the recorded program is larger or the like.

In the case of using the date and time of the update of the event information specified in the plan sharing action, the score calculation unit 110 may calculate the score by performing weighting according to an amount of the updated information related to the event. Also, the score calculation unit 110 may calculate the score by performing weighting according to the kind of the updated information related to the event. The kind of the information related to the event is, for instance, the date and time of holding the event, the place for holding the event, the performer, the match card, the player scheduled to appear, a starting pitcher when a game is baseball, scoring situations, and the like as described above. In the case that the event is baseball, the score calculation unit 110 may calculate the score by placing a larger weight when the scoring situations change.

Also, in the case that the plan sharing server 100 uses the activity of friends for the event information specified in the plan sharing action in the score calculation in the score calculation unit 110, the score calculation unit 110 may perform weighting further according to the content of the activity. While details of the content of the activity will be described later, weighting may be performed such that certain two activities are turned to one different activity.

When the calculation of the score is started in the score calculation unit 110 (step S151), the plan sharing server 100 first acquires history information on the plan sharing action of the user who is the object of the score calculation and the friend of the user, which is managed in the user information management unit 120 in the score calculation unit 110 (step S152). Upon acquiring the history information on the plan sharing action in step S152, the plan sharing server 100 subsequently extracts a weighting attribute of the item at the time of calculating the score in the score calculation unit 110 (step S153). The weighting attribute of the item is, for instance, whether the event information has been updated, whether the friend has executed the action for the plan sharing action, whether the recording reservation or viewing has been performed for the event which is the object of the plan sharing action, whether the time period to the date and time of the start is short, or the like.

The plan sharing server 100 determines in the score calculation unit 110 whether the event information to be the object of the score calculation has been updated (step S154). The score calculation unit 110 may determine whether the event information to be the object of the score calculation has been updated depending on whether or not the event information managed by the event information management unit 130 has been updated before the score calculation.

As a result of determination in the step S153, when the event information to be the object of the score calculation has been updated, the plan sharing server 100 multiplies an event information update point weighting attribute and performs addition to the score in the score calculation unit 110 (step S155). On the other hand, when the event information to be the object of the score calculation has not been updated as a result of the determination in the step S153, the plan sharing server 100 skips processing in step S154.

Next, the plan sharing server 100 determines in the score calculation unit 110 whether or not the friend of the user to be the object of the score calculation has executed the action for the plan sharing action of the event to be the object of the score calculation (step S156). The score calculation unit 110 may determine whether or not the friend of the user to be the object of the score calculation has executed the action from the information managed by the user information management unit 120.

As a result of determination in the step S156, when the friend of the user to be the object of the score calculation has executed the action for the plan sharing action of the event to be the object of the score calculation, the plan sharing server 100 multiplies all friend point weighting attributes and performs addition to the score in the score calculation unit 110 (step S157). On the other hand, when the friend of the user to be the object of the score calculation has not executed the action for the plan sharing action of the event to be the object of the score calculation as a result of the determination in the step S156, the plan sharing server 100 skips processing in step 5157.

Subsequently, the plan sharing server 100 determines in the score calculation unit 110 whether or not the user has made the recording reservation or performed viewing for the plan sharing action of the event to be the object of the score calculation (step S158). The score calculation unit 110 may determine whether or not the user has made the recording reservation or performed viewing for the plan sharing action of the event to be the object of the score calculation from the information managed by the user information management unit 120.

As a result of determination in the step S158, when the user has made the recording reservation or performed viewing for the plan sharing action of the event to be the object of the score calculation, the plan sharing server 100 multiplies a device control point weighting attribute and performs addition to the score in the score calculation unit 110 (step S159). On the other hand, when the user has not made the recording reservation or performed viewing for the plan sharing action of the event to be the object of the score calculation as a result of the determination in the step S158, the plan sharing server 100 skips processing in step S159.

Next, the plan sharing server 100 determines in the score calculation unit 110 a length of the time before the event start for the plan sharing action of the event to be the object of the score calculation (step S160). The score calculation unit 110 may determine the length of the time before the event start for the plan sharing action of the event to be the object of the score calculation from the information managed by the event information management unit 130.

As a result of determination in the step S160, when the length of the time before the event start for the plan sharing action of the event to be the object of the score calculation is short (for instance, it is within one hour before the event start or the like), the plan sharing server 100 multiplies a time period point weighting attribute and performs addition to the score in the score calculation unit 110 (step S161). On the other hand, when the length of the time before the event start for the plan sharing action of the event to be the object of the score calculation is long, the plan sharing server 100 skips processing in step S162. The plan sharing server 100 may change the weighting according to the time corresponding to the time period before the event start.

Finally, the plan sharing server 100 stores the score calculated by the score calculation unit 110 in the event information management unit 130 (step S162). Storage of the score in the event information management unit 130 may be executed by the score calculation unit 110 for instance.

The plan sharing server 100 according to one embodiment of the present disclosure can calculate the score of the events registered in the plan sharing action by executing the processing illustrated in FIG. 13. Then, the plan sharing server 100 according to one embodiment of the present disclosure can perform weighting to the score by presence/absence of the update of the event information, execution of the action for the events by the friend, the device operation, and the length of the time period before the start by executing the processing illustrated in FIG. 13.

Figure 14:
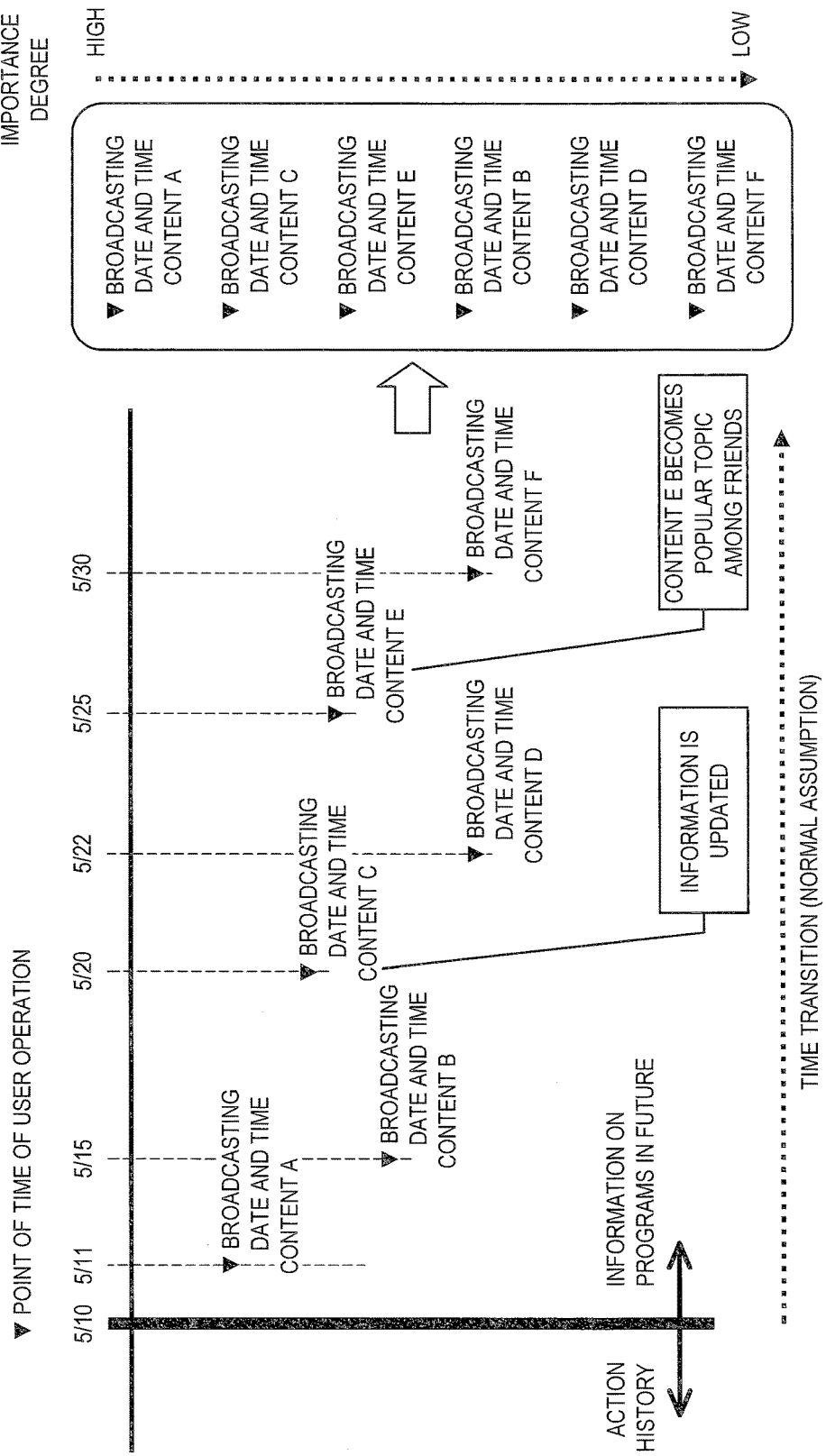
FIG. 14 is an explanatory diagram illustrating an outline of a calculation method of a score of an event registered in a plan sharing action.

Here, a calculation method of the score of the events registered in the plan sharing action by the plan sharing server 100 according to one embodiment of the present disclosure will be summarized. FIG. 14 is an explanatory diagram illustrating an outline of the calculation method of the score of the events registered in the plan sharing action by the plan sharing server 100 according to one embodiment of the present disclosure.

FIG. 14 illustrates an example of the case that the user has performed the operation to the SNS provided by the SNS system 10 on May 10, broadcasting is planned on May 10 or thereafter, and the plan sharing server 100 calculates importance degrees of the individual content registered in the plan sharing action at the point of time of May 10.

As illustrated in FIG. 14, the individual content registered in the plan sharing action are pieces of content A, B, C, D, E and F in the order from the one closest to the date and time of the broadcasting. Here, as illustrated in FIG. 14, it is assumed that the information on the content C for which the broadcasting is planned on May 20 is updated at the point of time of May 10, and the content E for which the broadcasting is planned on May 25 becomes a popular topic among the friends of the user at the point of time of May 10. In this case, the plan sharing server 100 increases the importance degrees of the content C and the content E, and calculates the scores so that the pieces of content A, C, E, B, D and F are arranged in the descending order of the scores.

In such a manner, by calculating the score of the events registered in the plan sharing action by using the date and time of the events, the presence/absence of the update of the information, the presence/absence of the activity of the friend, the presence/absence of the device control and the like, the plan sharing server 100 can perform efficient management when the event such as the content is shared among the users. Then, by calculating the score of the events registered in the plan sharing action, the plan sharing server 100 can present the events in the descending order of the scores on the GUI provided by the SNS system 10 to be described later.

The operation example of the information processing system 1 according to one embodiment of the present disclosure has been described above. Next, an example of the GUI provided by the information processing system 1 according to one embodiment of the present disclosure will be described.

[GUI Example Displayed at Terminal Device]

Figure 15:
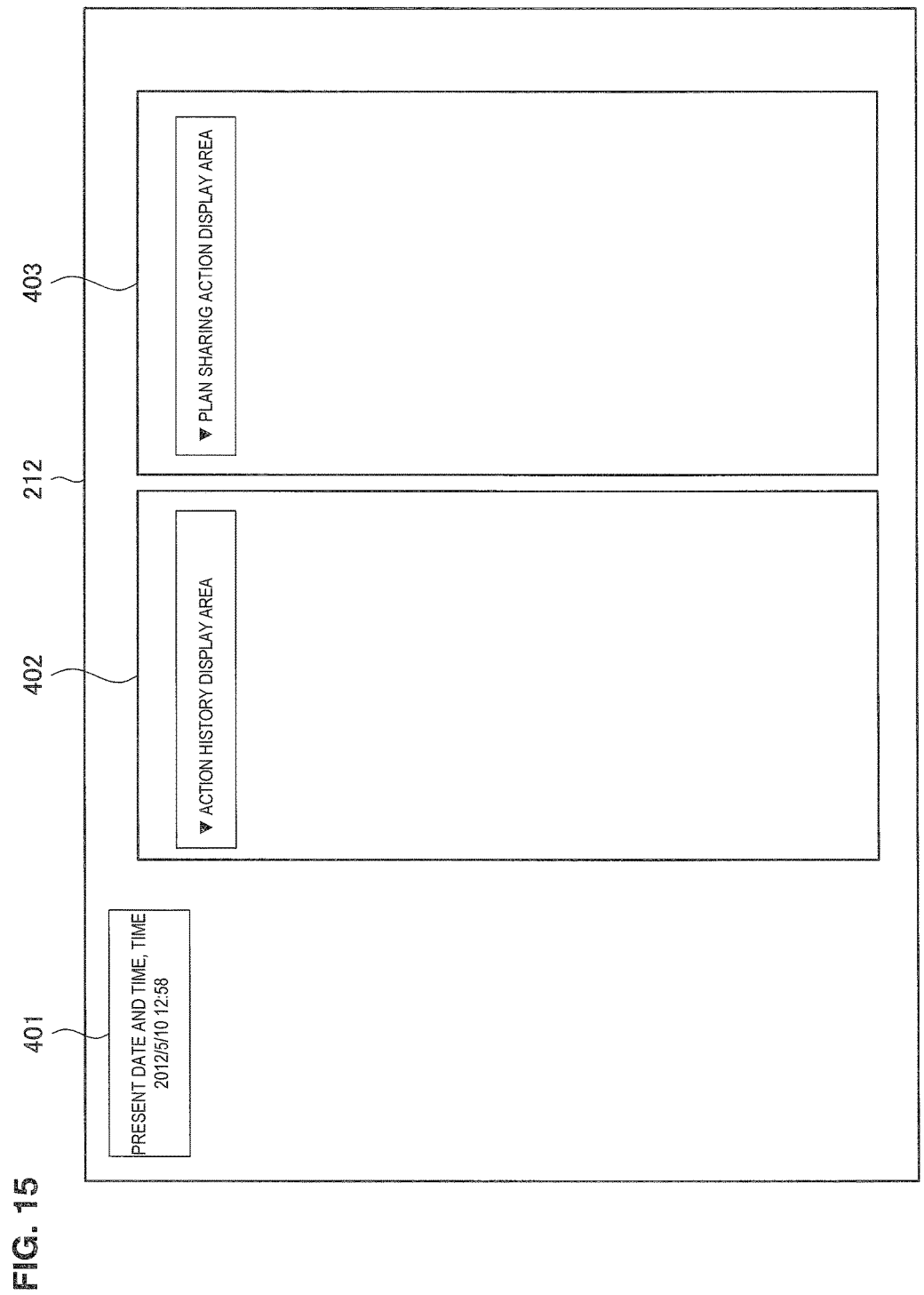
FIG. 15 is an explanatory diagram illustrating an example of a GUI provided by the information processing system 1 according to one embodiment of the present disclosure.

FIG. 15 is an explanatory diagram illustrating an example of the GUI provided by the information processing system 1 according to one embodiment of the present disclosure. FIG. 15 illustrates an example of the GUI for displaying the plan sharing action that is displayed at the terminal device 200 by the SNS system 10. The GUI displayed at the terminal device 200 is generated in the user interface provision unit 24 of the SNS server 20 for instance. Then, the terminal device 200 executes control so as to display the GUI at the display unit 212 by the control unit 213. Hereinafter, the example of the GUI provided by the information processing system 1 according to one embodiment of the present disclosure will be described using FIG. 154.

FIG. 15 illustrates the state where a present time display area 401, an action history display area 402, and a plan sharing action display area 403 are displayed at the display unit 212 of the terminal device 200 by the SNS system 10.

The present time display area 401 is an area for displaying the present date and time. The action history display area 402 is an area for displaying the action history at the present time displayed in the present time display area 401 in the SNS provided by the SNS system 10. In the action history display area 402, the action history of the user who is a friend on the SNS are displayed in the order of intimacy with the friend, the time of the occurrence of history and the importance degree of the activity, for instance.

The plan sharing action display area 403 is an area for displaying the plan sharing action such as the information on the event planned in the future. The event displayed in the plan sharing action display area 403 is displayed according to the score at the present time displayed in the present time display area 401, which is obtained by score calculation processing by the plan sharing server 100 described above.

Next, an example of the information displayed in the plan sharing action display area 403 will be described.

Figure 16:
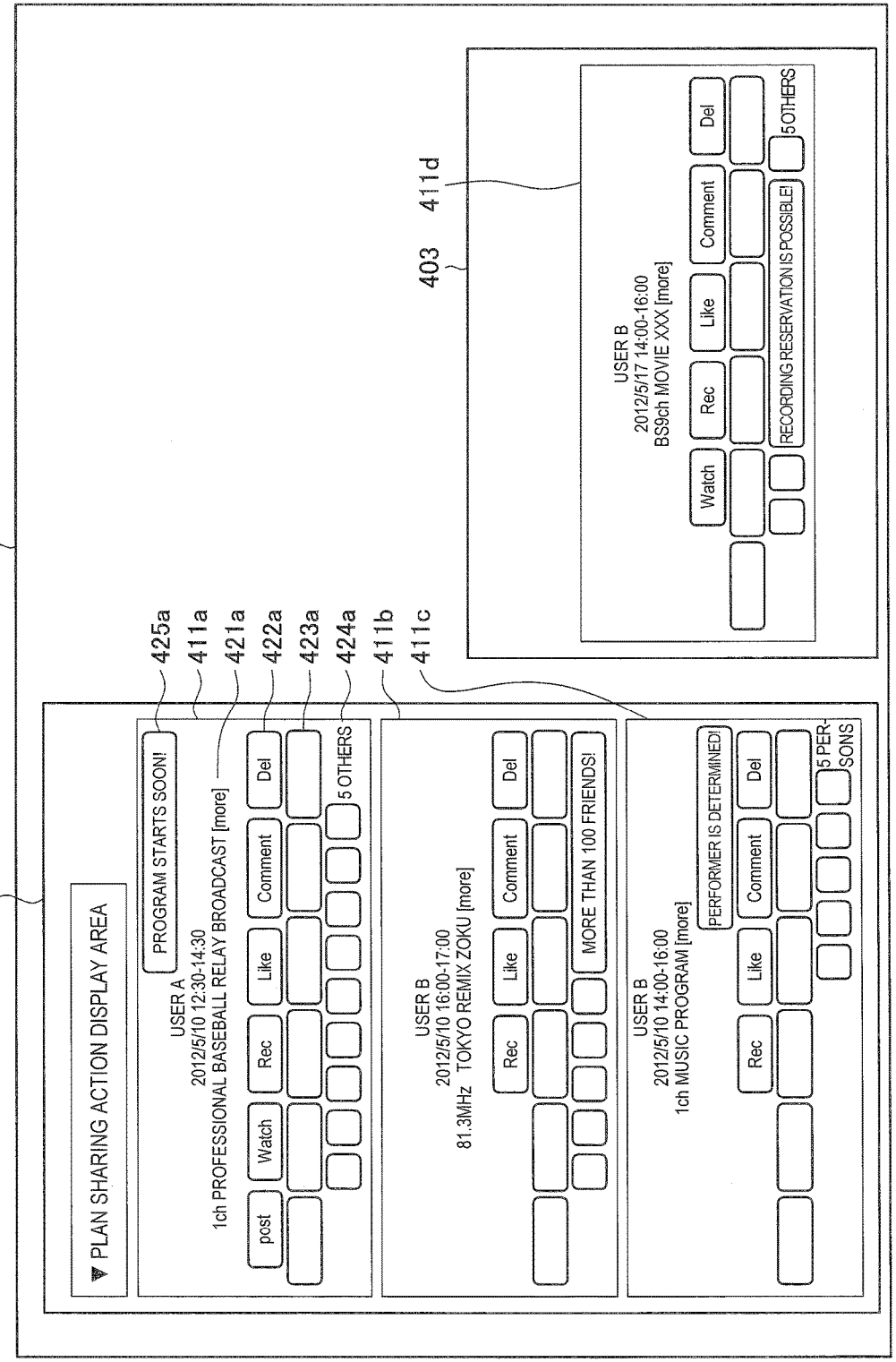
FIG. 16 is an explanatory diagram illustrating an example of a GUI provided by the information processing system 1 according to one embodiment of the present disclosure.

FIG. 16 is an explanatory diagram illustrating an example of the GUI provided by the information processing system 1 according to one embodiment of the present disclosure. FIG. 16 illustrates an example of the information displayed in the plan sharing action display area 403 by the SNS system 10. Hereinafter, the example of the GUI provided by the information processing system 1 according to one embodiment of the present disclosure will be described using FIG. 16.

In FIG. 16, for convenience of descriptions, only the plan sharing action display area 403 is displayed at the display unit 212 and the plan sharing action display area 403 is divided into two columns and illustrated; however, as illustrated in FIG. 15, the plan sharing action display area 403 may be displayed in one column.

FIG. 16 illustrates the state where four events are displayed in the plan sharing action display area 403. The information on the individual events is displayed respectively in event information display areas 411a, 411b, 411c and 411d by the event information distribution unit 140 for instance. Here, representing the four event information display areas, the individual pieces of information displayed in the event information display area 411a will be described.

The event information display area 411a includes a basic information display area 421a, an activity display area 422a, a related information display area 423a, a friend information display area 424a, and a reason display area 425a.

The basic information display area 421a is an area for displaying basic information on the event displayed in the event information display area 411a. The basic information on the event includes, for instance, a name of the user who has registered the plan sharing action for the event, a name of the event, an implementation period of the event, and the like. When the event is the television program, a title of the television program, a broadcasting television station, the broadcasting time and the like are the basic information on the event.

The activity display area 422a is an area for displaying the plan sharing activities in the plan sharing action. FIG. 16 illustrates "Post", "Watch", "Rec", "Like", "Comment" and "Del" as the activities in the plan sharing action. "Post" is the activity of registering the plan sharing action in his/her own sharing action and registering it as the action history. "Watch" is the activity of, when the event registered in the plan sharing action is the television program or the other content, explicitly indicating that the user is viewing the program or the content, and registering it as the action history. "Rec" is the activity of, when the event registered in the plan sharing action is the television program or the other content, reserving recording of the program or the content and registering it as the action history. "Like" is the activity of indicating favorable reaction to the event registered in the plan sharing action and to be registered to the action history. "Comment" is the activity of registering a comment on the event registered in the plan sharing action to the plan sharing action and to be registered to the action history. "Del" is the activity of deleting the plan sharing action from his/her own part.

The terminal device 200 receives the operation for the activities in the operation unit 216. The user of the terminal device 200 can execute the individual activities illustrated in FIG. 16 by operating the operation unit 216. Of course, the plan sharing activity illustrated in FIG. 16 is one example and the plan sharing activity of the present disclosure is not limited to the example.

The related information display area 423a is an area for displaying the information related to the user who has registered the plan sharing action.

The friend information display area 424a is an area for displaying the information on the friend who has executed the plan sharing activity for the plan sharing action. The information on the friend displayed in the friend information display area 424a is a name and a portrait photo of the friend for instance.

The reason display area 425a is an area for indicating by which reason the plan sharing action is displayed in the high order. For instance, the information such as that the program is to start soon, more than 100 friends have executed the plan sharing activity, the performer in the program is determined, the recording reservation has become possible, and the like is displayed in the reason display area 425a.

These pieces of information are displayed on the basis of the information managed in the user information management unit 120 and the event information management unit 130 of the plan sharing server 100 and the information managed in the activity management unit 23 of the SNS server 20 and the like.

Figure 17:
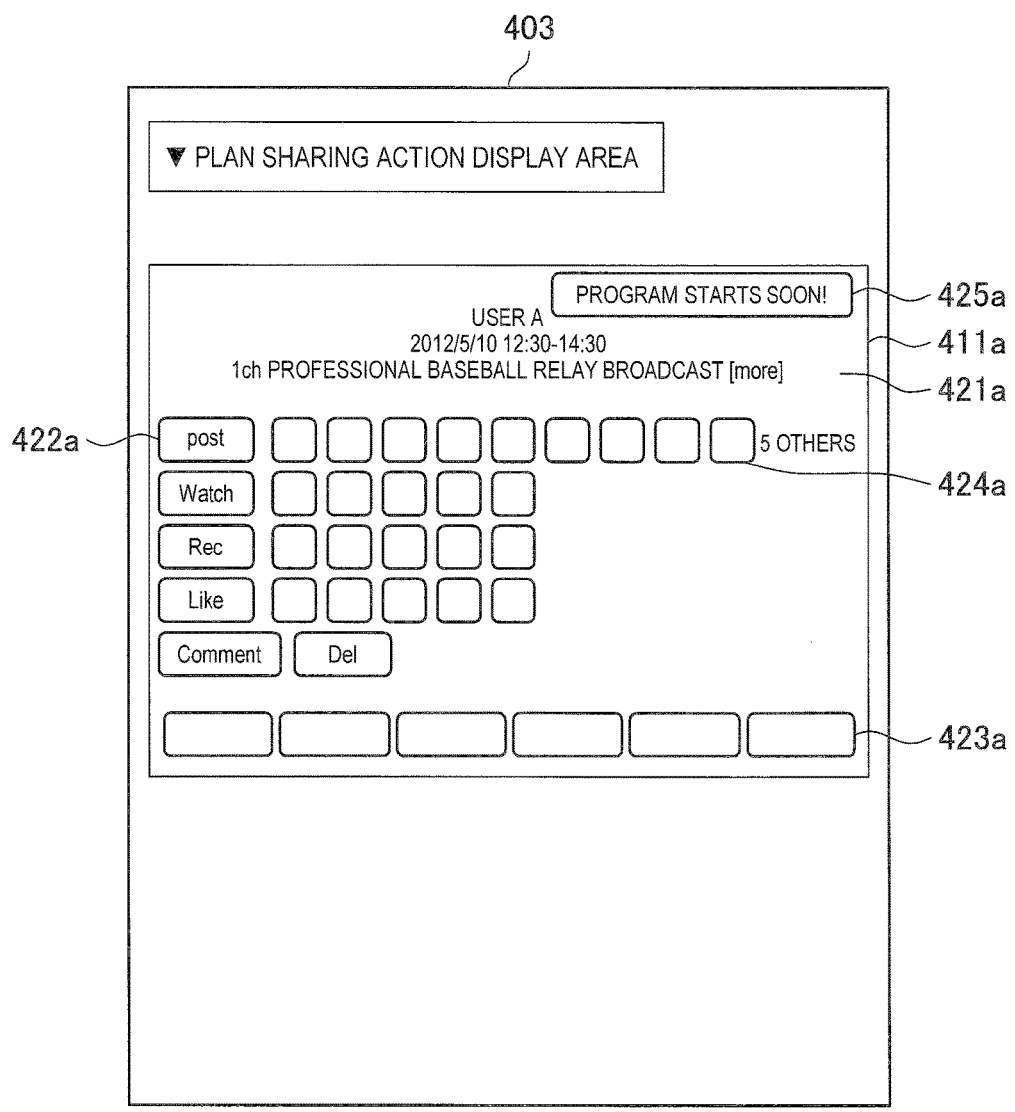
FIG. 17 is an explanatory diagram illustrating an example of a GUI provided by the information processing system 1 according to one embodiment of the present disclosure.

The information displayed in the plan sharing action display area 403 is not limited to the one illustrated in FIG. 16. FIG. 17 is an explanatory diagram illustrating an example of the GUI provided by the information processing system 1 according to one embodiment of the present disclosure. FIG. 17 illustrates a modification of the information displayed in the plan sharing action display area 403 by the SNS system 10.

FIG. 17 illustrates a display example of the information in the plan sharing action display area 403 in the case that the activity display area 422a is provided with the friend information display area 424a for each activity so as to easily recognize which user has executed which activity. In this way, by providing the friend information display area 424a for each activity, the SNS system 10 provided with the plan sharing server 100 can present which user has executed which activity and how many friends have executed which activity.

Figure 18:
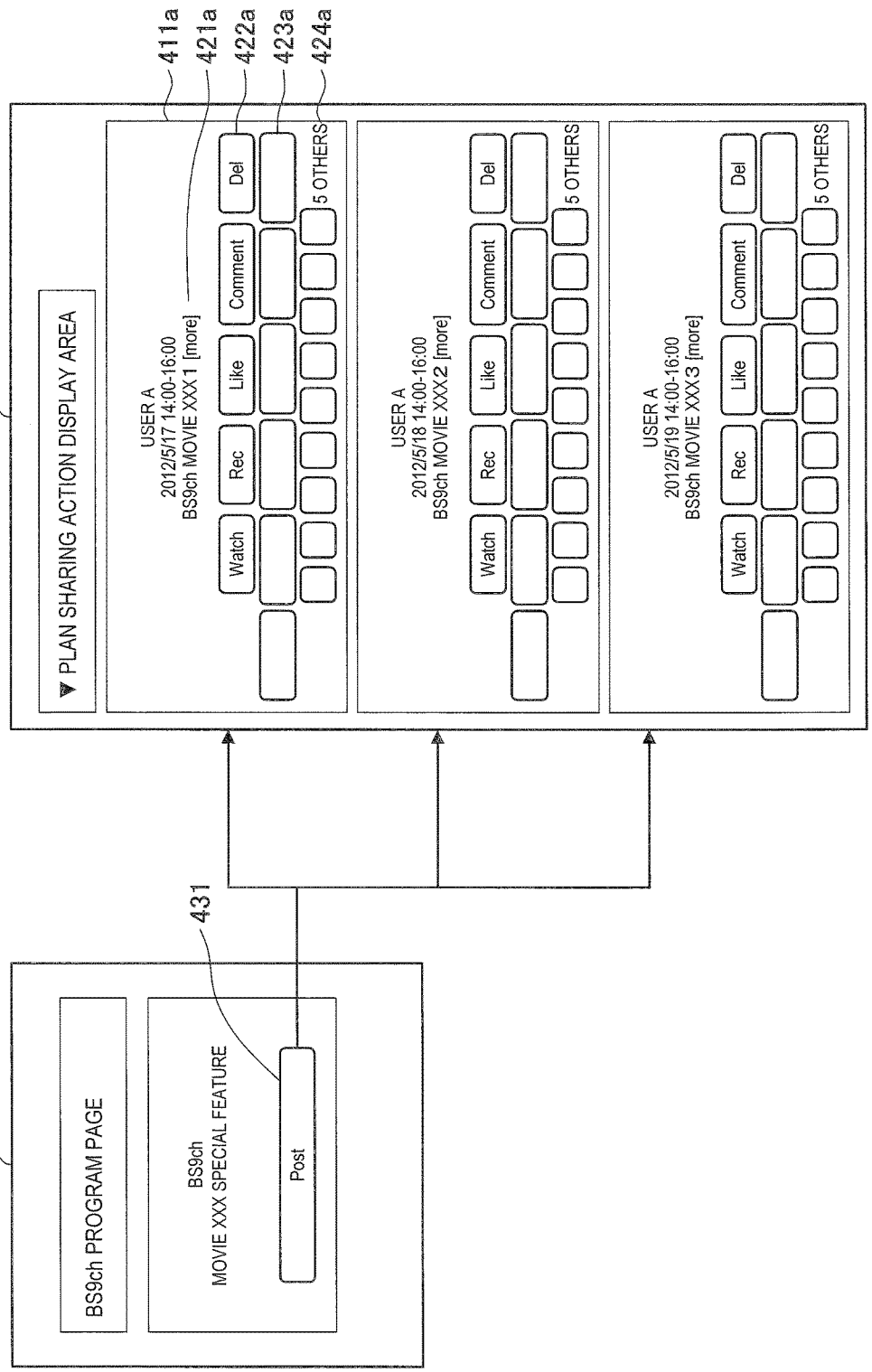
FIG. 18 is an explanatory diagram illustrating an example of a GUI provided by the information processing system 1 according to one embodiment of the present disclosure.

Subsequently, a registration example of the plan sharing action will be described. FIG. 18 is an explanatory diagram illustrating an example of the GUI provided by the information processing system 1 according to one embodiment of the present disclosure. FIG. 18 illustrates the registration example of the plan sharing action to the plan sharing action display area 403 by the user of the SNS system 10.

For instance, when a certain user views a web page 404 of a certain television station and recognizes that a certain interesting movie is to be broadcasted in a few days, the user can register the plan sharing action for the movie by depressing an activity button 431 provided on the web page 404. The activity button 431 is a button for registering the activity to the SNS system 10, and when the user depresses the activity button 431, depression of the activity button 431 is notified to the SNS system 10. The SNS system 10 registers, on the basis of the depression of the activity button 431, the activity to the SNS server 20 and the plan sharing action of the user to the plan sharing server 100, respectively. Note that, the web page 404 may be provided by the WWW server 50 for instance.

When the activity button 431 is depressed, as illustrated in FIG. 18, the SNS system 10 displays the plan sharing action accompanying the depression of the activity button 431 in the plan sharing action display area 403. FIG. 18 illustrates the example that three programs are displayed in the plan sharing action display area 403 by the depression of one activity button 431. The SNS system 10 may register the plurality of programs to the plan sharing action by the depression of one activity button 431 in this way.

Figure 19:
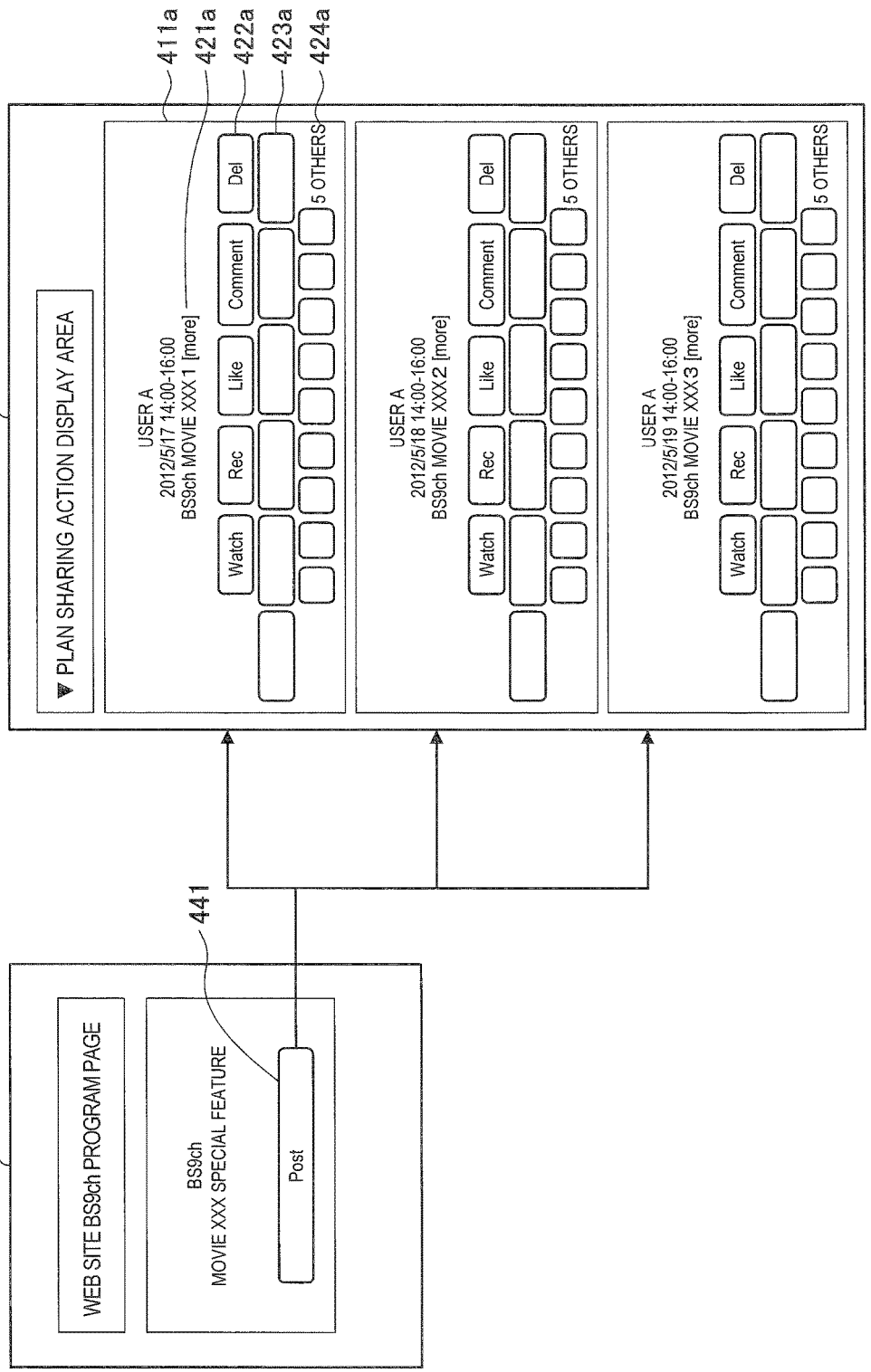
FIG. 19 is an explanatory diagram illustrating an example of a GUI provided by the information processing system 1 according to one embodiment of the present disclosure.

A modification of the registration of the plan sharing action will be described. FIG. 18 illustrates the case that the activity button 431 is provided on the web page 404 provided by the WWW server 50 for instance; however, the present disclosure is not limited to the example. For instance, the activity button may be provided on a page provided by the SNS system 10. FIG. 19 is an explanatory diagram illustrating an example of the GUI provided by the information processing system 1 according to one embodiment of the present disclosure. FIG. 19 illustrates a registration example of the plan sharing action to the plan sharing action display area 403 by the user of the SNS system 10.

For instance, when a certain user views a page 405 of a certain television station, which is provided by the SNS system 10, and recognizes that a certain interesting movie is to be broadcasted in a few days, the user can register the plan sharing action for the movie by depressing an activity button 441 provided on the page 405. The processing thereafter is similar to the case that the activity button 431 is provided on the web page 404.

In such a manner, even when the activity button 441 is provided not only on the web page 404 provided by the WWW server 50 for instance but also on the page 405 provided by the SNS system 10, the SNS system 10 can make the user register the plan sharing action.

Figure 20:
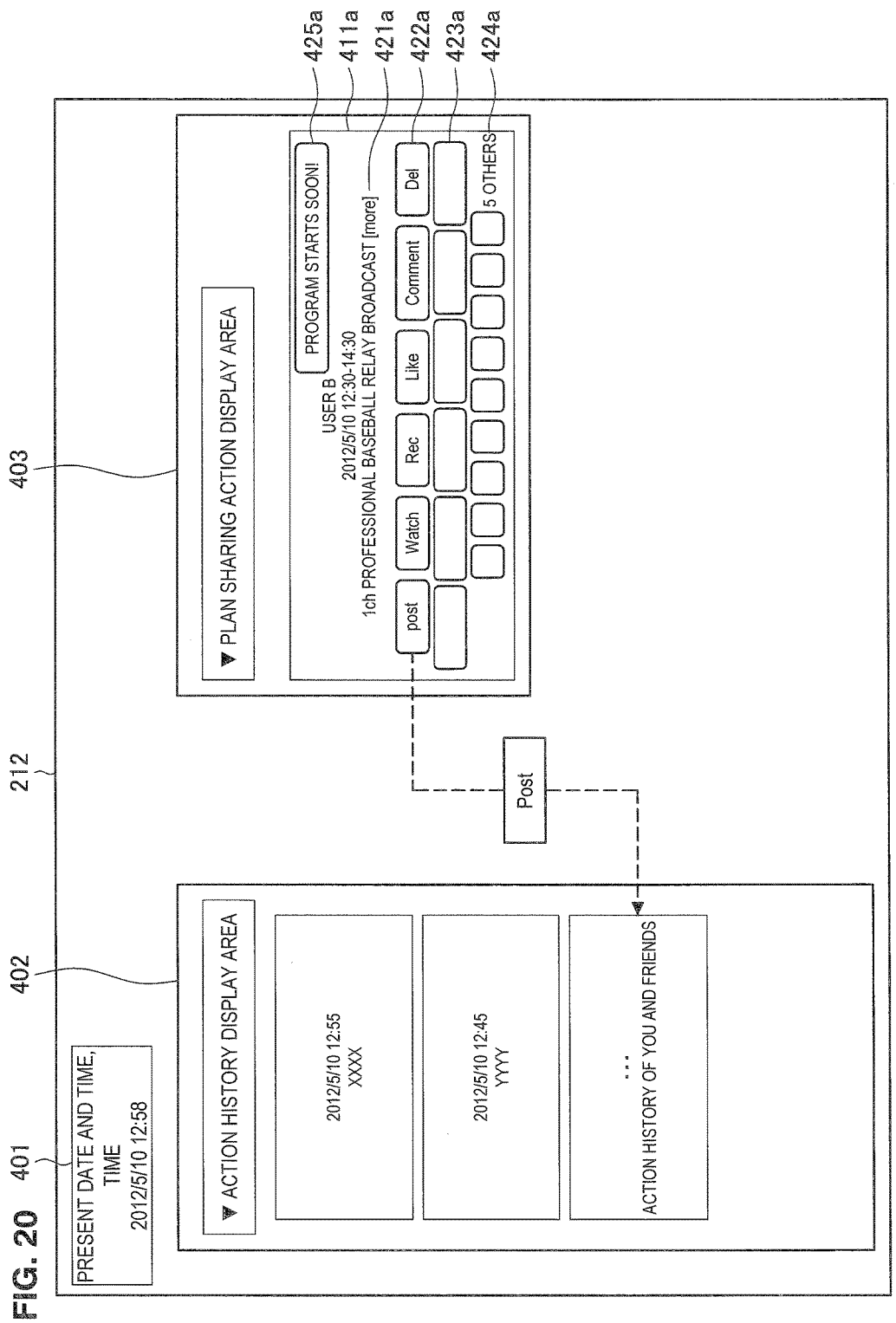
FIG. 20 is an explanatory diagram illustrating an example of a GUI provided by the information processing system 1 according to one embodiment of the present disclosure.

Next, a registration example from the plan sharing action to the action history will be described. FIG. 20 is an explanatory diagram illustrating an example of the GUI provided by the information processing system 1 according to one embodiment of the present disclosure. FIG. 20 illustrates an example of the time of registering the plan sharing action displayed in the plan sharing action display area 403 to the plan sharing action of the user by the user of the SNS system 10.

FIG. 20 illustrates the state where the plan sharing action registered by the user B who is the user different from the present user (the user A for instance) is displayed in the plan sharing action display area 403 of the user A. Here, it is assumed that the user A has executed the "Post" activity displayed in the activity display area 422a to the plan sharing action registered by the user B. The SNS system 10 registers the plan sharing action registered by the user B to the action history display area of the user A according to the "Post" activity of the user A.

Figure 21:
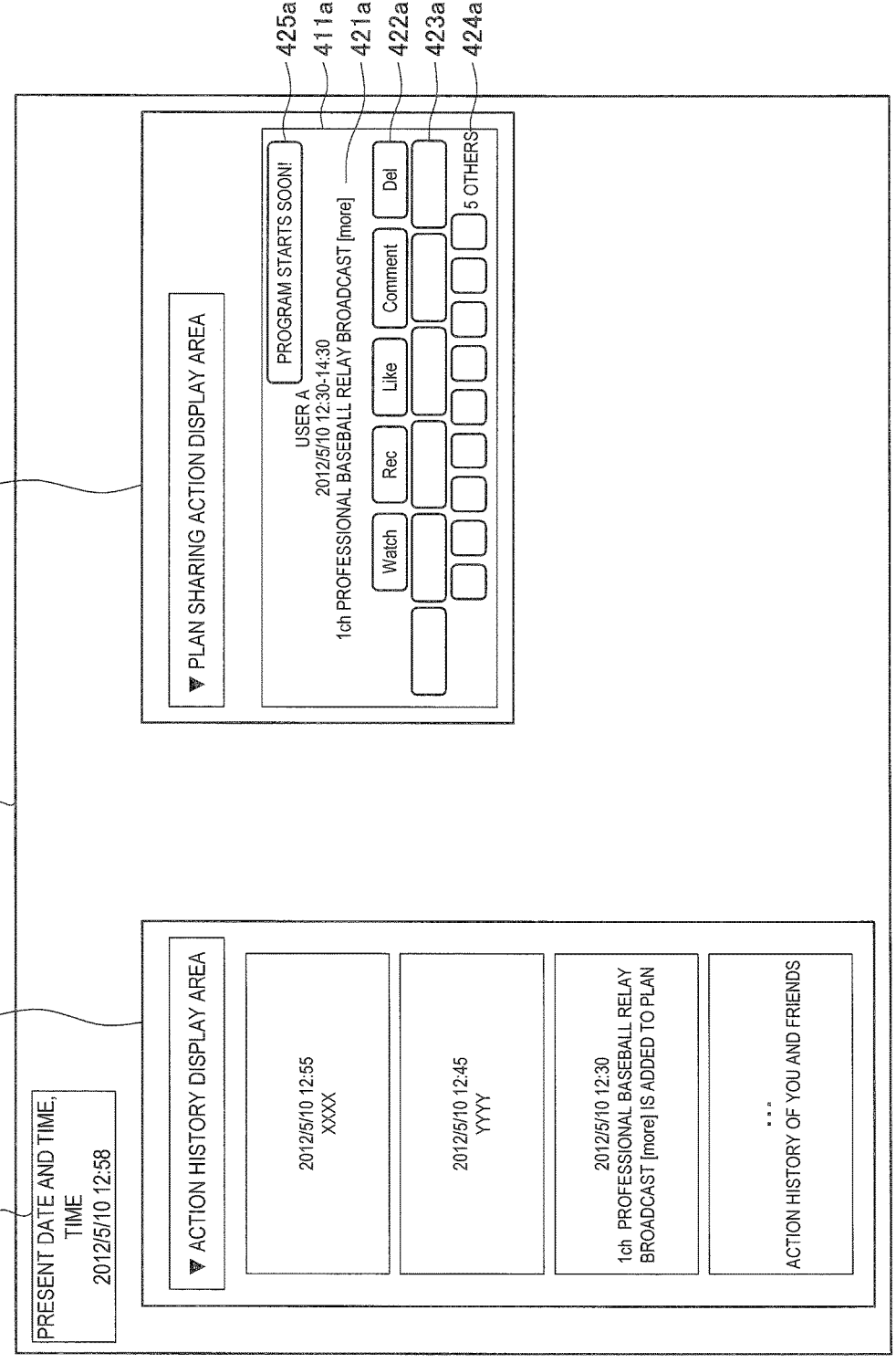
FIG. 21 is an explanatory diagram illustrating an example of a GUI provided by the information processing system 1 according to one embodiment of the present disclosure.

FIG. 21 is an explanatory diagram illustrating an example of the GUI provided by the information processing system 1 according to one embodiment of the present disclosure. FIG. 21 illustrates an example of the time of registering the plan sharing action displayed in the plan sharing action display area 403 to the plan sharing action of the user by the user of the SNS system 10.

As illustrated in FIG. 21, the SNS system 10 executes control such that, by the execution of the "Post" activity by the user A, the event registered in the plan sharing action by the user B is changed to the one of the user A and is also displayed in the action history display area 402 of the user A. By the execution of the "Post" activity displayed in the activity display area 422a by the user A, the SNS system 10 can register the plan sharing action registered by the user B to the action history display area of the user A.

Figure 22:
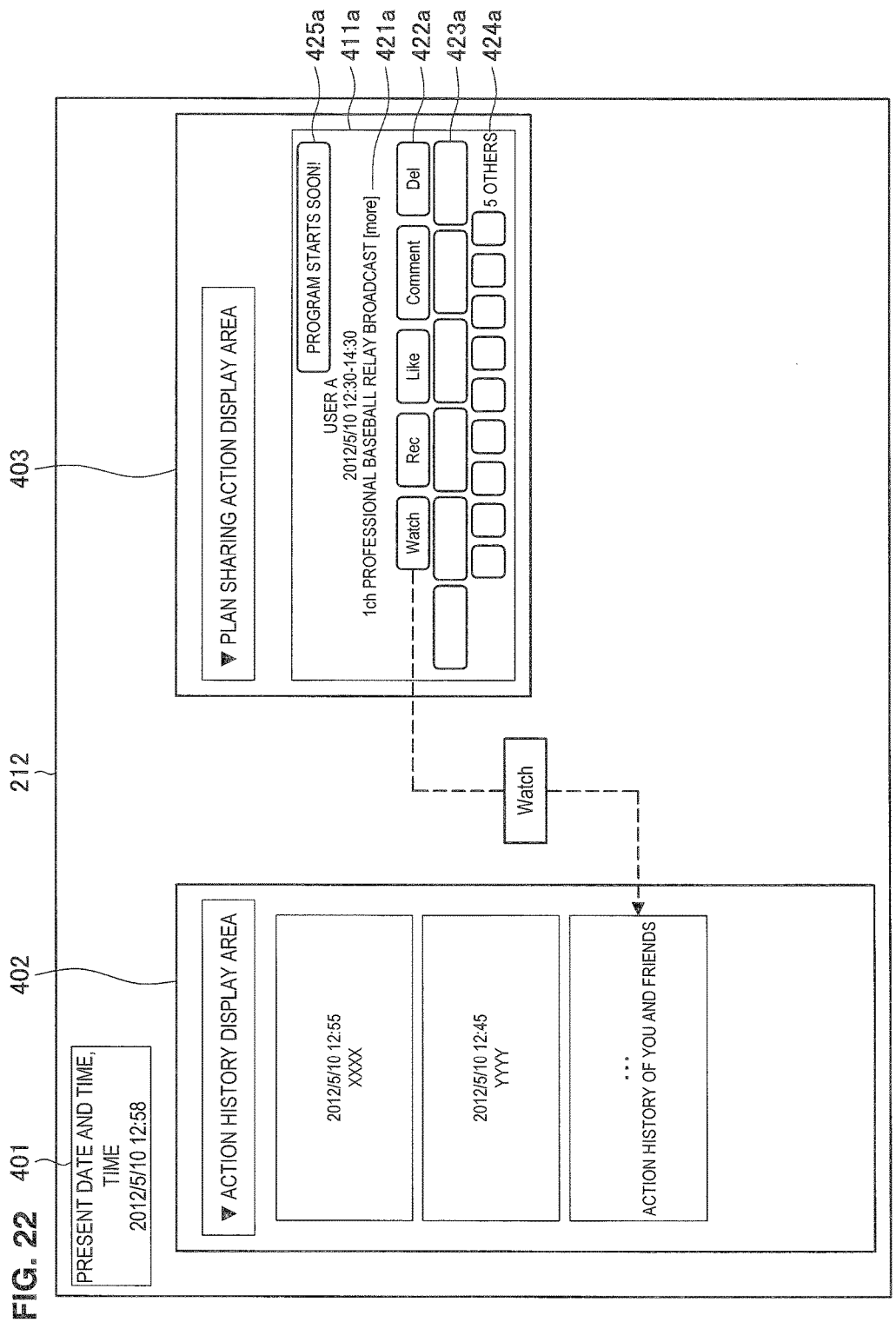
FIG. 22 is an explanatory diagram illustrating an example of a GUI provided by the information processing system 1 according to one embodiment of the present disclosure.

Next, a display example of the time of viewing the program registered beforehand in the plan sharing action will be described. FIG. 22 is an explanatory diagram illustrating an example of the GUI provided by the information processing system 1 according to one embodiment of the present disclosure. FIG. 22 illustrates a display example of the time of viewing the program by the user of the SNS system 10 for the plan sharing action displayed in the plan sharing action display area 403.

In the case that the program registered in the plan sharing action is being broadcasted, the user of the SNS system 10 can execute the "Watch" activity of explicitly indicating that the user is viewing the program, which is displayed in the activity display area 422a. The SNS system 10 makes reflection on the action history of the user according to the "Watch" activity.

Figure 23:
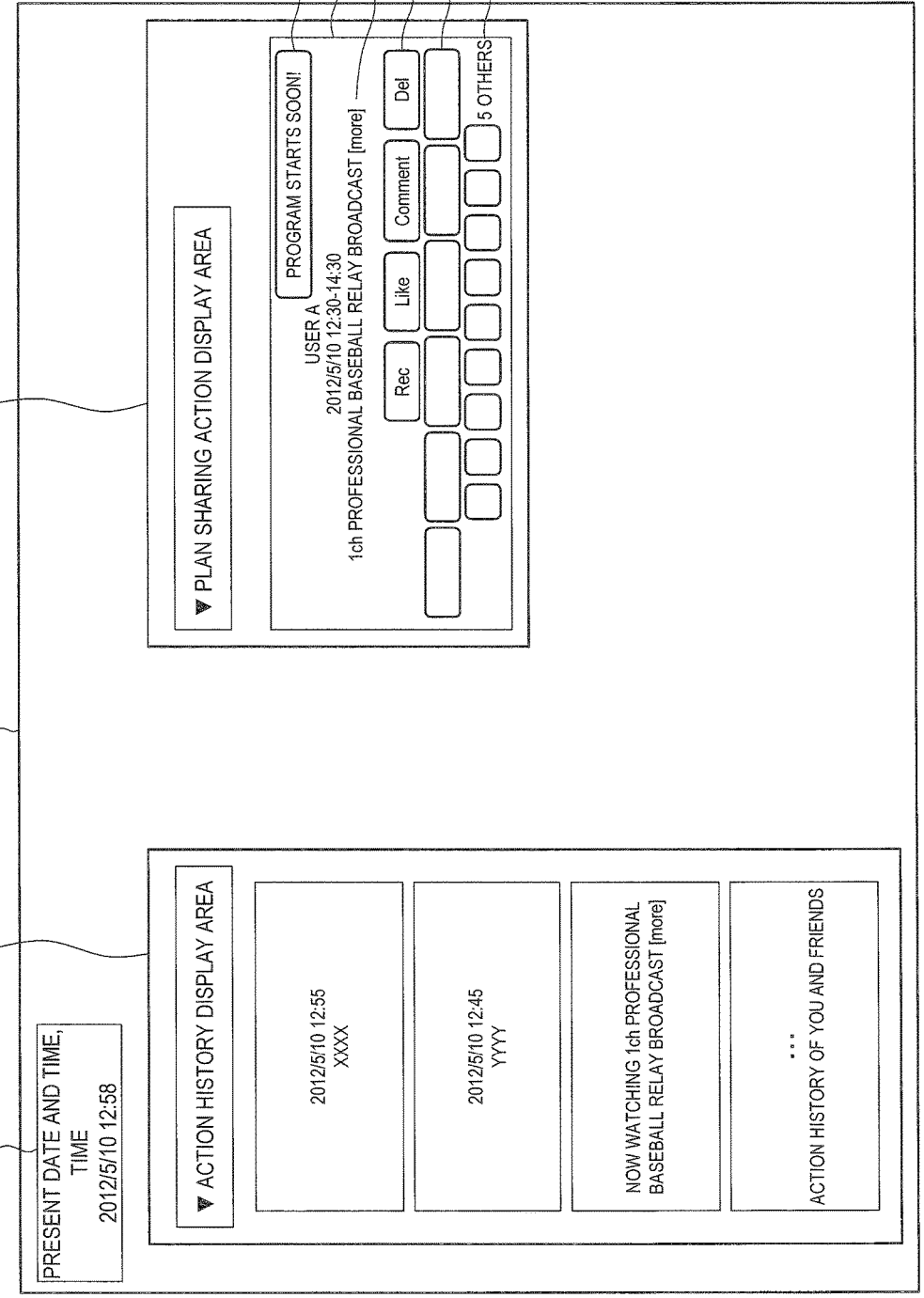
FIG. 23 is an explanatory diagram illustrating an example of a GUI provided by the information processing system 1 according to one embodiment of the present disclosure.

FIG. 23 is an explanatory diagram illustrating an example of the GUI provided by the information processing system 1 according to one embodiment of the present disclosure. FIG. 23 illustrates an example of the GUI provided by the information processing system 1 when the user A executes the "Watch" activity from the state of FIG. 21. As illustrated in FIG. 23, the SNS system 10 executes control so that the event is displayed in the action history display area 402 by the execution of the "Watch" activity by the user A. By executing control so that the event is displayed in the action history display area 402 by the execution of the "Watch" activity by the user A, the SNS system 10 can make the fact that the user A has executed the "Watch" activity be shared with the other user who is the friend of the user A.

Figure 24:
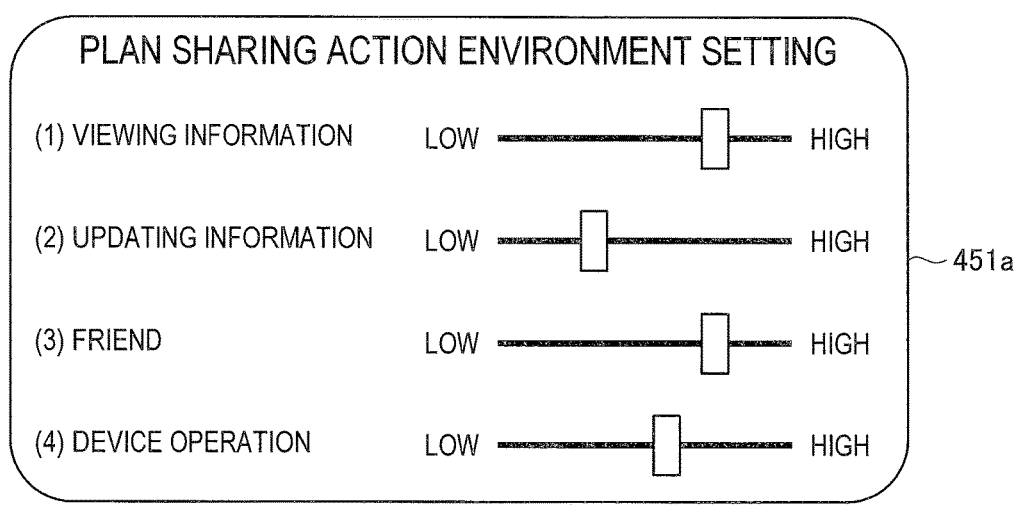
FIG. 24 is an explanatory diagram illustrating an example of a GUI provided by the information processing system 1 according to one embodiment of the present disclosure.

Next, an example of the GUI used for the score calculation of the event registered in the plan sharing action will be described. FIG. 24 is an explanatory diagram illustrating an example of the GUI provided by the information processing system 1 according to one embodiment of the present disclosure. FIG. 24 illustrates an example of the GUI for making the user set which element is to be considered as important when calculating the score of the event registered in the plan sharing action.

FIG. 24 illustrates a plan sharing action environment setting area 451a. The plan sharing action environment setting area 451a is provided with slider bars for setting a degree of importance for the individual elements that are "viewing information" indicating the time period before the broadcasting, "update information" indicating the presence/absence of the update of the event information, "friend" indicating the presence/absence of the activity of the friend, and "device operation" indicating the presence/absence of the device operation, when calculating the score of the event registered in the plan sharing action. The SNS system 10 can make the user set which element is to be considered as important by the GUI illustrated in FIG. 24.

Figure 25:
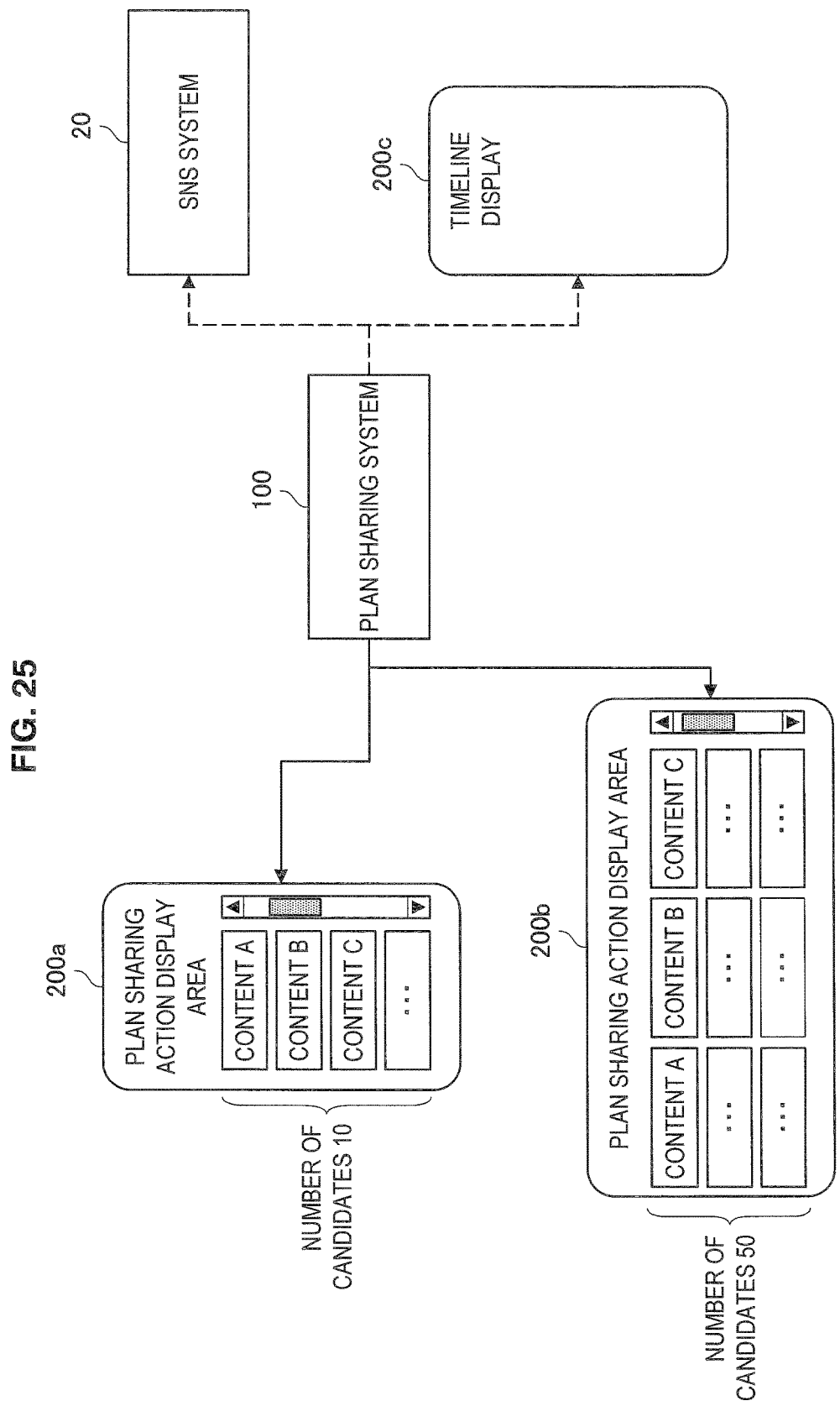
FIG. 25 is an explanatory diagram illustrating an example of a GUI provided by the information processing system 1 according to one embodiment of the present disclosure.

The SNS system 10 may change the number of the events displayed in the plan sharing action display area 403 described above according to a screen size of the terminal device. FIG. 25 is an explanatory diagram illustrating an example of the GUI provided by the information processing system 1 according to one embodiment of the present disclosure. FIG. 25 illustrates the example that the number of the events displayed in the plan sharing action display area 403 is changed according to the screen size of the terminal device.

For instance, in the case that the terminal device 200a is a device with a relatively small screen size like a smartphone or a cellular phone, the plan sharing server 100 limits the number of the events displayed in the plan sharing action display area 403 to 10, for instance. On the other hand, in the case that the terminal device 200b is a device with a relatively large screen size like a personal computer, the plan sharing server 100 extends the number of the events displayed in the plan sharing action display area 403 to 50, for instance. Also, the SNS system 10 may determine what kind of devices the terminal devices 200a and 200b are from device information (an OS, the screen size, the kind of a browser and the like) when the terminal devices 200a and 200b have accessed the SNS system 10 for instance.

In this way, the SNS system 10 makes display suited to the device possible by changing the number of the events displayed in the plan sharing action display area 403 according to the screen size of the terminal device.

Also, the SNS system 10 can present the plan sharing actions registered in the plan sharing server 100 to the terminal device in a time sequential manner. FIG. 25 illustrates the terminal device 200c on which the plan sharing actions registered in the plan sharing server 100 are presented in the time sequential manner. Also, the SNS system 10 can extract preference information from the SNS server 20 on the basis of the score calculated by the plan sharing server 100.

Figure 26:
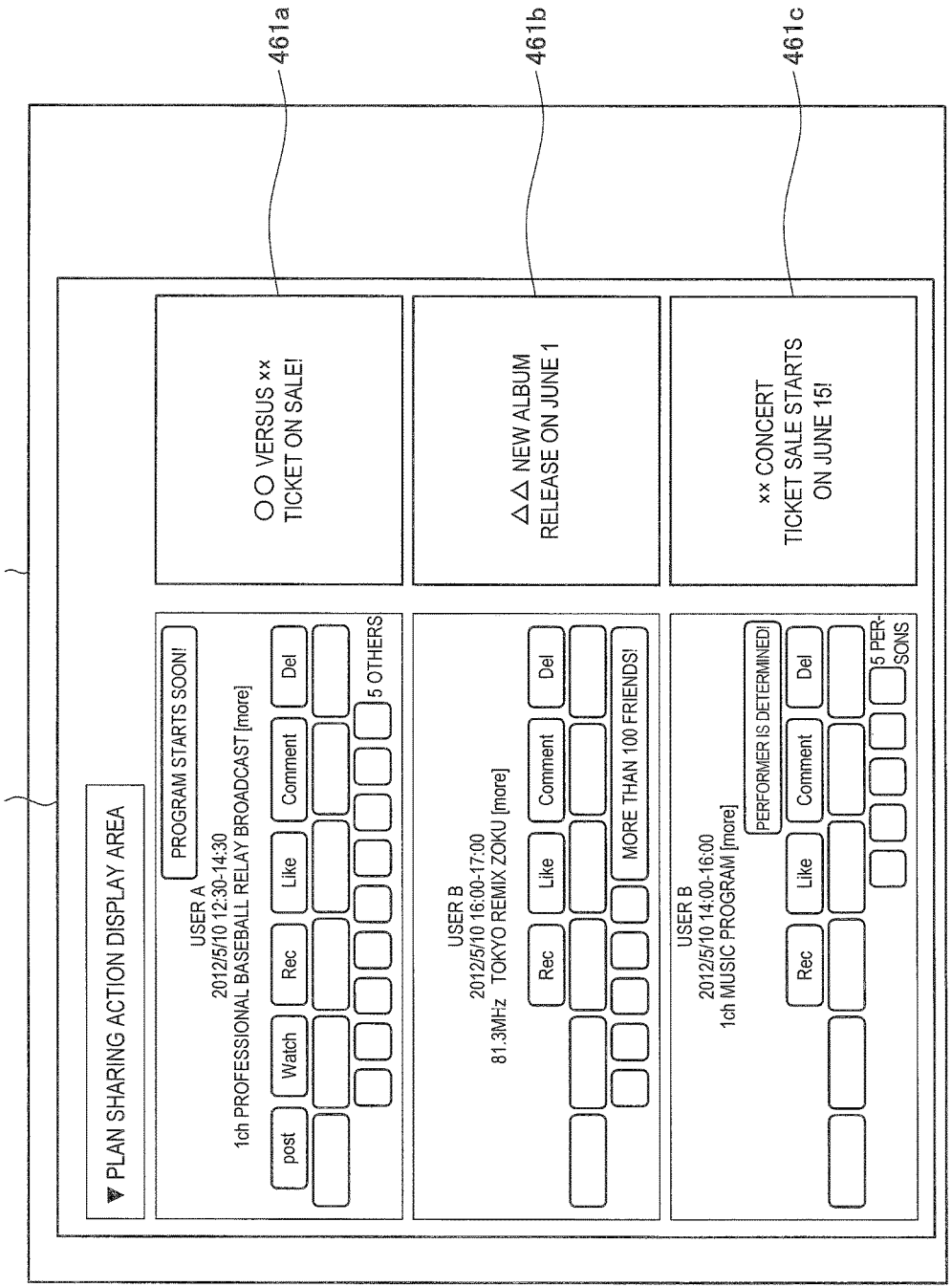
FIG. 26 is an explanatory diagram illustrating an example of a GUI provided by the information processing system 1 according to one embodiment of the present disclosure.

The information processing system 1 according to the present embodiment may acquire advertisements related to the individual events displayed in the plan sharing action display area 403 from the advertisement information provision server 60, and present them near the individual events. FIG. 26 is an explanatory diagram illustrating an example of the GUI provided by the information processing system 1 according to one embodiment of the present disclosure. FIG. 26 illustrates an example of the GUI when presenting the advertisements related to the respective events near the individual events displayed in the plan sharing action display area 403.

FIG. 26 illustrates the state where advertisement information display areas 461a, 461b and 461c are displayed on the right side of the individual events in the plan sharing action display area 403. In the SNS system 10, for instance, the advertisement information provision server 60 acquires the advertisements to be displayed in the advertisement information display areas 461a, 461b and 461c. The information processing system 1 according to one embodiment of the present disclosure can provide effective advertisement information for the user by presenting the advertisements related to the individual events registered in the plan sharing action by the event information distribution unit 140 for instance, as illustrated in FIG. 26.

The example of the GUI provided by information processing system 1 according to one embodiment of the present disclosure has been described above with reference to the drawings. Of course, it is needless to say that the GUI provided by the information processing system 1 according to one embodiment of the present disclosure is not limited to the ones indicated in the descriptions so far.

<2. Summary>

As described above, the information processing system 1 according to one embodiment of the present disclosure can make the information be shared among the users who are friends on the SNS provided by the SNS system 10 by the plan sharing action, for the events to be implemented in the future. Then, the information processing system 1 according to one embodiment of the present disclosure can perform the efficient management when the events such as the content are shared among the users by calculating the score of the events registered in the plan sharing action by using the date and time of the events, the presence/absence of the update of the information, the presence/absence of the activity of the friend, the presence/absence of the device control, and the like. Then, the information processing system 1 according to one embodiment of the present disclosure can present the events in the descending order of the scores on the GUI provided by the SNS system 10 by calculating the score of the events registered in the plan sharing action.

It is not always needed to process respective steps in the processing to be executed by the individual devices in this description in the time sequential manner along the order described as a sequence diagram or a flowchart. For instance, respective steps in the processing to be executed by the individual devices may be processed in order different from the order described as the flowchart or may be processed in parallel.

Also, a computer program for making hardware such as a CPU, a ROM and a RAM built in the individual devices demonstrate functions equal to the configuration of the individual devices described above can be prepared. Also, a storage medium having the computer program stored therein can be provided. Also, by configuring respective functional blocks indicated in a functional block diagram by the hardware, a series of processing can be realized by the hardware as well.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An information processing device including:

a score calculation unit that calculates, for one or more events for which a plan is set by one or more of users in a user group composed of the plurality of users capable of sharing information by satisfying a predetermined condition and for which the information is capable of being shared in the user group, a score on a predetermined calculation basis using event information which is information related to the events.

(2)

The information processing device according to (1), wherein the events are content planned to be broadcasted in the future.

(3)

The information processing device according to (1) or (2), wherein the score calculation unit uses information on a time period between present time and time and date of broadcasting start of the content as the event information, and performs calculation in a manner that the score becomes higher as the time period between the present time and the time and date of broadcasting start of the content is shorter, as the predetermined calculation basis.

(4)

The information processing device according to any of (1) to (3), wherein the score calculation unit uses information on a time period between present time and time and date when information related to the content has been updated as the event information, and performs calculation in a manner that the score becomes higher as the time period between the present time and the time and date when the information related to the content has been updated is shorter, as the predetermined calculation basis.

(5)

The information processing device according to (4), wherein the score calculation unit performs weighting according to an amount of the updated information related to the content and calculates the score.

(6)

The information processing device according to (4) or (5), wherein the score calculation unit performs weighting according to a kind of the updated information related to the content and calculates the score.

(7)

The information processing device according to any of (2) to (6), wherein the score calculation unit uses information on a number of posting operations from one or more users in the user group for the content as the event information, and performs calculation in a manner that the score becomes higher as the number of posting operations from one or more users in the user group for the content is larger, as the predetermined calculation basis.

(8)

The information processing device according to (7), wherein the score calculation unit performs weighting according to content of the posting operations from one or more users in the user group for the content and calculates the score.

(9)

The information processing device according to any of (2) to (8), wherein the score calculation unit uses information on a number of viewing operations in the user group for the content as the event information, and performs calculation in a manner that the score becomes higher as the number of viewing operations in the user group for the content is larger, as the predetermined calculation basis.

(10)

The information processing device according to any of (2) to (9), wherein the score calculation unit uses information on a time period between present time and time and date of broadcasting end of the content as the event information, and performs calculation in a manner that the score becomes higher as the time period between the present time and the time and date of broadcasting end of the content is shorter, as the predetermined calculation basis.

(11)

The information processing device according to any of (1) to (10), wherein the score calculation unit calculates scores of the events by using two or more pieces of the event information and totaling scores calculated for the respective pieces of event information.

(12)
The information processing device according to any of (1) to (11), further including:
an event presentation unit that sorts and presents the events in an order of scores calculated by the score calculation unit.

(13)
The information processing device according to (12),
wherein the event presentation unit presents together by which event information the events presented in a high order are presented in the high order.

(14)
The information processing device according to (12) or (13),
wherein the event presentation unit presents together event related information related to the events.

(15)
The information processing device according to (14),
wherein the event related information is advertisement information.

(16)
An information processing method including:
a step of calculating, for one or more events for which a plan is set by one or more of users in a user group composed of the plurality of users capable of sharing information by satisfying a predetermined condition and for which the information is capable of being shared in the user group, a score on a predetermined calculation basis using event information which is information related to the events.

(17)
A terminal device including:
a display control unit that executes control, for one or more events for which a plan is set by one or more of users in a user group composed of the plurality of users capable of sharing information by satisfying a predetermined condition and for which the information is capable of being shared in the user group, in a manner that the events sorted in an order of scores calculated on a predetermined calculation basis is displayed using event information which is information related to the events.

(18)
The terminal device according to (17), further including:
a reception unit that receives a posting operation from a user for the events whose display is controlled by the display control unit.

REFERENCE SIGNS LIST 1 information processing system
2 network
10 SNS system
20 SNS server
30 information provision system
40 content distribution server
50 WWW server
60 advertisement information provision server
70 recording reservation server
100 plan sharing server
110 score calculation unit
120 user information management unit
130 event information management unit
140 event information distribution unit
200a, 200b, 200c terminal device
250a, 250b television
260 recording and reproducing device
300 router

The invention claimed is:

1. An information processing device comprising:
a plan sharing server that calculates, for one or more events for which a plan is set by one or more of users in a user group composed of the plurality of users capable of sharing information by satisfying a predetermined condition and for which the information is capable of being shared in the user group, a score on a predetermined calculation basis using event information which is information related to the events, wherein when the information processing device receives a notification from an external device indicating that the event information has been updated the plan sharing server is caused to recalculate the score; and
a graphical user interface for enabling display of the plan, wherein the graphical user interface comprises a setting area that enables the user to set an importance, in degrees of a scale from low to high, for each element of a plurality of elements used in calculating the score such that the user can see the degree of importance of an element relative to the degree of importance of another element by viewing the setting area.

2. The information processing device according to claim 1,
wherein the events are content planned to be broadcasted in the future.

3. The information processing device according to claim 2,
wherein the plan sharing server uses information on a time period between present time and time and date of broadcasting start of the content as the event information, and performs calculation in a manner that the score becomes higher as the time period between the present time and the time and date of broadcasting start of the content is shorter, as the predetermined calculation basis.

4. The information processing device according to claim 2,
wherein the plan sharing server uses information on a time period between present time and time and date when information related to the content has been updated as the event information, and performs calculation in a manner that the score becomes higher as the time period between the present time and the time and date when the information related to the content has been updated is shorter, as the predetermined calculation basis.

5. The information processing device according to claim 4,
wherein the plan sharing server performs weighting according to an amount of the updated information related to the content and calculates the score.

6. The information processing device according to claim 4,
wherein the plan sharing server performs weighting according to a kind of the updated information related to the content and calculates the score.

7. The information processing device according to claim 2,
wherein the plan sharing server uses information on a number of posting operations from one or more users in the user group for the content as the event information, and performs calculation in a manner that the score becomes higher as the number of posting operations from one or more users in the user group for the content is larger, as the predetermined calculation basis.

8. The information processing device according to claim 7,
wherein the plan sharing server performs weighting according to content of the posting operations from one or more users in the user group for the content and calculates the score.

9. The information processing device according to claim 2,
wherein the plan sharing server uses information on a number of viewing operations in the user group for the content as the event information, and performs calculation in a manner that the score becomes higher as the number of viewing operations in the user group for the content is larger, as the predetermined calculation basis.

10. The information processing device according to claim 2,
wherein the plan sharing server uses information on a time period between present time and time and date of broadcasting end of the content as the event information, and performs calculation in a manner that the score becomes higher as the time period between the present time and the time and date of broadcasting end of the content is shorter, as the predetermined calculation basis.

11. The information processing device according to claim 1,
wherein the plan sharing server calculates scores of the events by using two or more pieces of the event information and totaling scores calculated for the respective pieces of event information.

12. The information processing device according to claim 1, wherein the plan sharing server sorts and presents the events in an order of scores calculated.

13. The information processing device according to claim 12,
wherein the plan sharing server presents event information on which presentation of the events is based.

14. The information processing device according to claim 12,
wherein the plan sharing server presents together event related information related to the events.

15. The information processing device according to claim 14,
wherein the event related information is advertisement information.

16. The information processing device according to claim 1, wherein the predetermined condition is registration of the one or more events by the one or more users.

17. The information processing device according to claim 16, wherein the predetermined calculation basis is that the score becomes higher as a period between a present time and date and a time and date of broadcasting start of content associated with the event becomes, or is, shorter.

18. An information processing method comprising:
calculating, for one or more events for which a plan is set by one or more of users in a user group composed of the plurality of users capable of sharing information by satisfying a predetermined condition and for which the information is capable of being shared in the user group, a score on a predetermined calculation basis using event information which is information related to the events, wherein when a notification is received indicating that the event information has been updated a step of recalculating the score is performed; and
providing a graphical user interface for enabling display of the plan, wherein the graphical user interface comprises a setting area that enables the user to set an importance, in degrees of a scale from low to high, for each element of a plurality of elements used in calculating the score such that the user can see the degree of importance of an element relative to the degree of importance of another element by viewing the setting area.

19. A device comprising:
one or more processors that execute control, for one or more events for which a plan is set by one or more of users in a user group composed of the plurality of users capable of sharing information by satisfying a predetermined condition and for which the information is capable of being shared in the user group, in a manner that the events sorted in an order of scores calculated on a predetermined calculation basis is displayed using event information which is information related to the events, wherein the scores have been recalculated when there was an update of the event information; and
a graphical user interface enabling display of the plan, wherein the graphical user interface comprises a setting area that enables the user to set an importance, in degrees of a scale from low to high, for each element of a plurality of elements used in calculating the score such that the user can see the degree of importance of an element relative to the degree of importance of another element by viewing the setting area.

20. The device according to claim 19, wherein the device is operable to receive a posting operation from a user for the events whose display is controlled by the one or more processors.

21. The device according to claim 19, wherein the graphical user interface comprises a plan sharing action display area for displaying a plan sharing action such as information on an event planned in the future.

22. The device according to claim 21, wherein one or more events are displayed in the plan sharing action display area and for each event information on the event is displayed in a respective event information display area.

23. The device according to claim 22, wherein each of the event information display areas comprises a basic information display area for displaying basic information on the event, and an activity display area for displaying one more plan sharing activities in the plan sharing action.

24. The device according to claim 19, wherein the device is configured such that a notification is provided to the users of the group of updated information on a social network service when the event information is updated.

25. The device according to claim 19, wherein the device is configured to propagate a notification to the users of the group of updated information on a social network service when the event information is updated.

26. The device according to claim 19, wherein the predetermined condition is registration of the one or more events by the one or more users.

27. The device according to claim 26, wherein the predetermined calculation basis is that the score becomes higher as a period between a present time and date and a time and date of broadcasting start of content associated with the event becomes, or is, shorter.

28. A device comprising:
a communication unit for communicating with other devices on a network;
a display unit for viewing content over the network and for providing an interface to the network;

a control unit for controlling information on the display unit; and a graphical user interface, wherein the device is configured to communicate with a plan sharing server on the network that calculates, for one or more events for which a plan is set by one or more of members of a group capable of sharing information by satisfying a condition and for which the information is capable of being shared in the group, a score on a calculation basis using event information which is information related to the events, such that the content of an event with a highest score is displayed on the display unit, and wherein the graphical user interface comprises a setting area that enables the user to set an importance, in degrees of a scale from low to high, for each element of a plurality of elements used in calculating the score such that the user can see the degree of importance of an element relative to the degree of importance of another element by viewing the setting area.

29. The device according to claim 28, further configured to receive a notification over the network indicating that the event information has been updated by the plan sharing server to cause recalculation of the score.

* * * * *